(12) United States Patent
Ye et al.

(10) Patent No.: US 12,157,479 B2
(45) Date of Patent: *Dec. 3, 2024

(54) AUTONOMOUS VEHICLE SAFETY PLATFORM SYSTEM AND METHOD

(71) Applicant: May Mobility, Inc., Ann Arbor, MI (US)

(72) Inventors: Jason Ye, Ann Arbor, MI (US); John Cavicchio, Ann Arbor, MI (US); Andres Tamez, Ann Arbor, MI (US); Jacob Lucero, Ann Arbor, MI (US); Justin Tesmer, Ann Arbor, MI (US); Anush Gandra, Ann Arbor, MI (US); Yaxin Luan, Ann Arbor, MI (US); Shane DeMeulenaere, Ann Arbor, MI (US)

(73) Assignee: May Mobility, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,904

(22) Filed: Apr. 28, 2023

(65) Prior Publication Data

US 2023/0303095 A1    Sep. 28, 2023

Related U.S. Application Data

(63) Continuation of application No. 17/846,963, filed on Jun. 22, 2022, now Pat. No. 11,673,564, which is a
(Continued)

(51) Int. Cl.
*B60W 50/029*    (2012.01)
*B60W 30/09*    (2012.01)
(Continued)

(52) U.S. Cl.
CPC .......... *B60W 50/029* (2013.01); *B60W 30/09* (2013.01); *B60W 30/0956* (2013.01);
(Continued)

(58) Field of Classification Search
None
See application file for complete search history.

(56) References Cited

U.S. PATENT DOCUMENTS

| 5,544,282 A | 8/1996 | Chen et al. |
| 6,199,013 B1 | 3/2001 | Oshea |

(Continued)

FOREIGN PATENT DOCUMENTS

| JP | 2009078735 A | 4/2009 |
| JP | 2011100492 A | 5/2011 |

(Continued)

OTHER PUBLICATIONS

Cunningham, A. , et al., "MPDM: Multipolicy Decision-Making in Dynamic, Uncertain Environments for Autonomous Driving", Proceedings of the IEEE International Conference on Robotics and Automation (ICRA) (2015).

(Continued)

*Primary Examiner* — Tamara L Weber
(74) *Attorney, Agent, or Firm* — Jeffrey Schox; Diana Lin

(57) ABSTRACT

A system 100 for autonomous vehicle operation can include: a low-level safety platform 130; and can optionally include and/or interface with any or all of: an autonomous agent 102, a sensor system, a computing system 120, a vehicle communication network 140, a vehicle control system 150, and/or any suitable components. The system functions to facilitate fallback planning and/or execution at the autonomous agent. Additionally or alternatively, the system can
(Continued)

function to transition the autonomous agent between a primary (autonomous) operation mode and a fallback operation mode.

20 Claims, 9 Drawing Sheets

Related U.S. Application Data continuation of application No. 17/550,461, filed on Dec. 14, 2021, now Pat. No. 11,396,302.

(60) Provisional application No. 63/125,304, filed on Dec. 14, 2020.

(51) Int. Cl.
  *B60W 30/095* (2012.01)
  *B60W 40/04* (2006.01)
  *B60W 60/00* (2020.01)
  *G06V 20/58* (2022.01)

(52) U.S. Cl.
  CPC ........ *B60W 40/04* (2013.01); *B60W 60/0011* (2020.02); *B60W 60/0015* (2020.02); *B60W 60/00274* (2020.02); *G06V 20/58* (2022.01); *B60W 2050/0292* (2013.01); *B60W 2554/40* (2020.02); *B60W 2554/80* (2020.02); *B60W 2556/50* (2020.02)

(56) References Cited

U.S. PATENT DOCUMENTS

| | | | |
|---|---|---|---|
| 8,949,016 B1 | 2/2015 | Ferguson et al. |
| 9,129,519 B2 | 9/2015 | Aoude et al. |
| 9,274,525 B1 | 3/2016 | Ferguson et al. |
| 9,368,026 B1 | 6/2016 | Herbach et al. |
| 9,495,874 B1 | 11/2016 | Zhu et al. |
| 9,618,938 B2 | 4/2017 | Olson et al. |
| 9,646,428 B1 | 5/2017 | Konrardy et al. |
| 9,720,412 B1 | 8/2017 | Zhu et al. |
| 9,811,760 B2 | 11/2017 | Richardson et al. |
| 9,914,452 B1 | 3/2018 | Ferguson et al. |
| 10,012,981 B2 | 7/2018 | Gariepy et al. |
| 10,062,294 B2 | 8/2018 | Kunzi et al. |
| 10,156,848 B1 | 12/2018 | Konrardy et al. |
| 10,235,882 B1 | 3/2019 | Aoude et al. |
| 10,248,120 B1 | 4/2019 | Siegel et al. |
| 10,386,856 B2 | 8/2019 | Wood et al. |
| 10,467,891 B1 | 11/2019 | Bart et al. |
| 10,518,770 B2 | 12/2019 | Kroop et al. |
| 10,518,783 B2 | 12/2019 | Tanimichi et al. |
| 10,540,892 B1 | 1/2020 | Fields et al. |
| 10,558,224 B1 | 2/2020 | Lin et al. |
| 10,564,641 B2 | 2/2020 | Vozar et al. |
| 10,564,643 B2 | 2/2020 | Lui et al. |
| 10,571,916 B2 | 2/2020 | Tschanz et al. |
| 10,586,254 B2 | 3/2020 | Singhal |
| 10,599,155 B1 | 3/2020 | Konrardy et al. |
| 10,614,709 B2 | 4/2020 | Vozar et al. |
| 10,642,276 B2 | 5/2020 | Huai |
| 10,654,476 B2 | 5/2020 | Wray et al. |
| 10,671,076 B1 | 6/2020 | Kobilarov et al. |
| 10,796,581 B2 | 10/2020 | Herbach et al. |
| 10,860,019 B2 | 12/2020 | Censi et al. |
| 10,969,470 B2 | 4/2021 | Voorheis et al. |
| 11,086,318 B1 | 8/2021 | Davis et al. |
| 11,087,200 B2 | 8/2021 | Olson et al. |
| 11,242,054 B2 | 2/2022 | Isele |
| 11,260,855 B2 | 3/2022 | Zhang |
| 11,281,213 B2 | 3/2022 | Cross et al. |
| 11,300,957 B2 | 4/2022 | Wray et al. |
| 11,352,023 B2 | 6/2022 | Fairley et al. |
| 11,396,302 B2 | 7/2022 | Ye et al. |
| 11,525,887 B2 | 12/2022 | Voorheis et al. |
| 11,554,793 B2 | 1/2023 | Han et al. |
| 11,565,717 B2 | 1/2023 | Kothbauer et al. |
| 2002/0062207 A1 | 5/2002 | Faghri |
| 2004/0100563 A1 | 5/2004 | Sablak et al. |
| 2005/0004723 A1 | 1/2005 | Duggan et al. |
| 2006/0184275 A1 | 8/2006 | Hosokawa et al. |
| 2006/0200333 A1 | 9/2006 | Dalal et al. |
| 2007/0193798 A1 | 8/2007 | Allard et al. |
| 2007/0276600 A1 | 11/2007 | King et al. |
| 2008/0033684 A1 | 2/2008 | Vian et al. |
| 2009/0088925 A1 | 4/2009 | Sugawara et al. |
| 2010/0114554 A1 | 5/2010 | Misra |
| 2010/0204867 A1 | 8/2010 | Longstaff |
| 2010/0228419 A1 | 9/2010 | Lee et al. |
| 2011/0142283 A1 | 6/2011 | Huang et al. |
| 2012/0089275 A1 | 4/2012 | Yao-Chang et al. |
| 2013/0054106 A1 | 2/2013 | Schmuedderich et al. |
| 2013/0141576 A1 | 6/2013 | Lord et al. |
| 2013/0253816 A1 | 9/2013 | Caminiti et al. |
| 2014/0195138 A1 | 7/2014 | Stelzig et al. |
| 2014/0244198 A1 | 8/2014 | Mayer |
| 2014/0277835 A1 | 9/2014 | Filev et al. |
| 2014/0309815 A1 | 10/2014 | Ricci et al. |
| 2015/0105961 A1 | 4/2015 | Callow |
| 2015/0284010 A1 | 10/2015 | Beardsley et al. |
| 2015/0302756 A1 | 10/2015 | Guehring et al. |
| 2015/0316928 A1 | 11/2015 | Guehring et al. |
| 2015/0321337 A1 | 11/2015 | Stephens |
| 2015/0344030 A1 | 12/2015 | Damerow et al. |
| 2016/0005333 A1 | 1/2016 | Naouri |
| 2016/0209840 A1 | 7/2016 | Kim |
| 2016/0314224 A1 | 10/2016 | Wei et al. |
| 2017/0031361 A1 | 2/2017 | Olson et al. |
| 2017/0032671 A1 | 2/2017 | Toyama et al. |
| 2017/0072853 A1 | 3/2017 | Matsuoka et al. |
| 2017/0123419 A1 | 5/2017 | Levinson et al. |
| 2017/0155696 A1 | 6/2017 | Dong et al. |
| 2017/0199523 A1 | 7/2017 | Barton-Sweeney et al. |
| 2017/0212513 A1 | 7/2017 | Iida et al. |
| 2017/0268896 A1 | 9/2017 | Bai et al. |
| 2017/0289341 A1 | 10/2017 | Rodriguez et al. |
| 2017/0291560 A1 | 10/2017 | Schroeder et al. |
| 2017/0291602 A1 | 10/2017 | Newman et al. |
| 2017/0301111 A1 | 10/2017 | Zhao et al. |
| 2017/0320500 A1 | 11/2017 | Yoo et al. |
| 2017/0323568 A1 | 11/2017 | Inoue et al. |
| 2017/0356748 A1 | 12/2017 | Jagnemma |
| 2018/0011485 A1 | 1/2018 | Ferren |
| 2018/0046182 A1 | 2/2018 | Joyce et al. |
| 2018/0047291 A1 | 2/2018 | Konishi et al. |
| 2018/0053102 A1 | 2/2018 | Martinson et al. |
| 2018/0065625 A1 | 3/2018 | Tijerina et al. |
| 2018/0070056 A1 | 3/2018 | Deangelis et al. |
| 2018/0082596 A1 | 3/2018 | Whitlow |
| 2018/0089563 A1 | 3/2018 | Redding et al. |
| 2018/0100743 A1 | 4/2018 | Diaz et al. |
| 2018/0183873 A1 | 6/2018 | Wang et al. |
| 2018/0184352 A1 | 6/2018 | Lopes et al. |
| 2018/0196427 A1 | 7/2018 | Majumdar et al. |
| 2018/0220283 A1 | 8/2018 | Condeixa et al. |
| 2018/0224851 A1 | 8/2018 | Park |
| 2018/0251126 A1 | 9/2018 | Linscott et al. |
| 2018/0267550 A1 | 9/2018 | Kopetz et al. |
| 2018/0268281 A1 | 9/2018 | Olson et al. |
| 2018/0293537 A1 | 10/2018 | Kwok |
| 2018/0299898 A1 | 10/2018 | Luo et al. |
| 2018/0330481 A1 | 11/2018 | Watanabe et al. |
| 2018/0365908 A1 | 12/2018 | Liu et al. |
| 2018/0367997 A1 | 12/2018 | Shaw et al. |
| 2019/0025819 A1* | 1/2019 | Ferguson ............ G08G 1/0145 |
| 2019/0027034 A1 | 1/2019 | Xu et al. |
| 2019/0039545 A1 | 2/2019 | Kumar et al. |
| 2019/0066399 A1 | 2/2019 | Jiang et al. |
| 2019/0096244 A1 | 3/2019 | Guruva Reddiar et al. |
| 2019/0101914 A1 | 4/2019 | Coleman et al. |
| 2019/0101919 A1 | 4/2019 | Kobilarov et al. |
| 2019/0106117 A1 | 4/2019 | Goldberg |
| 2019/0113919 A1 | 4/2019 | Englard et al. |

(56) References Cited

U.S. PATENT DOCUMENTS

| | | |
|---|---|---|
| 2019/0113929 A1 | 4/2019 | Mukadam et al. |
| 2019/0130878 A1 | 5/2019 | Bradley |
| 2019/0138007 A1 | 5/2019 | Baghsorkhi et al. |
| 2019/0138524 A1 | 5/2019 | Singh et al. |
| 2019/0147610 A1 | 5/2019 | Frossard et al. |
| 2019/0180529 A1 | 6/2019 | Smith |
| 2019/0196465 A1 | 6/2019 | Hummelshøj |
| 2019/0220011 A1 | 7/2019 | Della Penna |
| 2019/0227553 A1 | 7/2019 | Kentley-Klay et al. |
| 2019/0235516 A1 | 8/2019 | Zhang et al. |
| 2019/0236950 A1 | 8/2019 | Li et al. |
| 2019/0256096 A1 | 8/2019 | Graf et al. |
| 2019/0258246 A1 | 8/2019 | Liu et al. |
| 2019/0258251 A1 | 8/2019 | Ditty et al. |
| 2019/0265059 A1 | 8/2019 | Warnick et al. |
| 2019/0271554 A1 | 9/2019 | Colgate et al. |
| 2019/0271981 A1 | 9/2019 | Oba |
| 2019/0291726 A1 | 9/2019 | Shalev-Shwartz et al. |
| 2019/0329771 A1 | 10/2019 | Wray et al. |
| 2019/0331758 A1 | 10/2019 | Malkes et al. |
| 2019/0332106 A1 | 10/2019 | Belloni Mourao et al. |
| 2019/0337509 A1 | 11/2019 | Shalev-Shwartz et al. |
| 2019/0366914 A1 | 12/2019 | Ochida et al. |
| 2020/0004241 A1 | 1/2020 | Levinson et al. |
| 2020/0017114 A1 | 1/2020 | Santoni et al. |
| 2020/0020226 A1 | 1/2020 | Stenneth et al. |
| 2020/0026286 A1 | 1/2020 | Vozar et al. |
| 2020/0057441 A1 | 2/2020 | Wang et al. |
| 2020/0086837 A1 | 3/2020 | Le Cornec |
| 2020/0094850 A1 | 3/2020 | Chi et al. |
| 2020/0097003 A1 | 3/2020 | Wray et al. |
| 2020/0098269 A1 | 3/2020 | Wray et al. |
| 2020/0122830 A1 | 4/2020 | Anderson et al. |
| 2020/0124447 A1 | 4/2020 | Schwindt et al. |
| 2020/0150661 A1 | 5/2020 | Vozar et al. |
| 2020/0159227 A1 | 5/2020 | Cohen et al. |
| 2020/0189731 A1 | 6/2020 | Mistry et al. |
| 2020/0209853 A1 | 7/2020 | Leach et al. |
| 2020/0209864 A1 | 7/2020 | Chen |
| 2020/0217668 A1 | 7/2020 | Cionca et al. |
| 2020/0233060 A1 | 7/2020 | Lull et al. |
| 2020/0255027 A1 | 8/2020 | Kulkarni et al. |
| 2020/0269843 A1 | 8/2020 | Wissing et al. |
| 2020/0290619 A1 | 9/2020 | Mehdi et al. |
| 2020/0293041 A1 | 9/2020 | Palanisamy |
| 2020/0294401 A1 | 9/2020 | Kerecsen |
| 2020/0298891 A1 | 9/2020 | Liang et al. |
| 2020/0309543 A1 | 10/2020 | Voznesensky |
| 2020/0339151 A1 | 10/2020 | Batts et al. |
| 2020/0346643 A1 | 11/2020 | Woon et al. |
| 2020/0346666 A1 | 11/2020 | Wray et al. |
| 2020/0355820 A1 | 11/2020 | Zeng et al. |
| 2020/0369294 A1 | 11/2020 | Jeon et al. |
| 2020/0400781 A1 | 12/2020 | Voorheis et al. |
| 2021/0042535 A1 | 2/2021 | Abbott et al. |
| 2021/0046924 A1 | 2/2021 | Caldwell et al. |
| 2021/0110484 A1 | 4/2021 | Shalev-Shwartz et al. |
| 2021/0116907 A1 | 4/2021 | Altman |
| 2021/0132606 A1 | 5/2021 | Basich et al. |
| 2021/0163021 A1 | 6/2021 | Frazzoli et al. |
| 2021/0181758 A1 | 6/2021 | Das et al. |
| 2021/0197864 A1 | 7/2021 | Oltmann et al. |
| 2021/0200207 A1 | 7/2021 | Soryal et al. |
| 2021/0208244 A1 | 7/2021 | Voorheis et al. |
| 2021/0229697 A1 | 7/2021 | Lee et al. |
| 2021/0245785 A1 | 8/2021 | Suzuki et al. |
| 2021/0252715 A1 | 8/2021 | Javidan et al. |
| 2021/0269063 A1 | 9/2021 | Lee et al. |
| 2021/0286651 A1 | 9/2021 | Ho et al. |
| 2021/0300412 A1 | 9/2021 | Dingli et al. |
| 2021/0339741 A1 | 11/2021 | Rezvan Behbahani et al. |
| 2021/0365701 A1 | 11/2021 | Eshet et al. |
| 2021/0394757 A1 | 12/2021 | Beller et al. |
| 2022/0063674 A1 | 3/2022 | De Francesco et al. |
| 2022/0076032 A1 | 3/2022 | Jain et al. |
| 2022/0081005 A1 | 3/2022 | Brown et al. |
| 2022/0114406 A1 | 4/2022 | Wyffels |
| 2022/0126878 A1 | 4/2022 | Moustafa et al. |
| 2022/0169263 A1 | 6/2022 | Li et al. |
| 2022/0185325 A1 | 6/2022 | Chen et al. |
| 2022/0204010 A1 | 6/2022 | Zhu et al. |
| 2022/0230080 A1 | 7/2022 | Isele et al. |
| 2022/0388547 A1 | 12/2022 | Yangel et al. |
| 2023/0005163 A1 | 1/2023 | Kim |
| 2023/0166764 A1 | 6/2023 | Johnson et al. |
| 2023/0174103 A1 | 6/2023 | Patel et al. |

FOREIGN PATENT DOCUMENTS

| | | |
|---|---|---|
| JP | 2015083417 A | 4/2015 |
| JP | 2016091039 A | 5/2016 |
| JP | 2016184276 A | 10/2016 |
| JP | 2018144720 A | 9/2018 |
| JP | 2020509963 A | 4/2020 |
| WO | 2015160900 A1 | 10/2015 |
| WO | 2018134901 A1 | 7/2018 |
| WO | 2018160486 A1 | 9/2018 |
| WO | 2020241955 A1 | 12/2020 |
| WO | 2021231452 A1 | 11/2021 |

OTHER PUBLICATIONS

Mehta, D., et al., "Autonomous Navigation in Dynamic Social Environments Using Multi-Policy Decision Making", Proceedings of the IEEE/RSJ International Conference on Intelligent Robots and Systems (IROS) (2016).

Mehta, D., et al., "Fast Discovery of Influential Outcomes For Risk-Aware MPDM", Proceedings go the IEEE International Conference on Robotics and Automation (ICRA) (2017).

Neumeier Stefan, et al., "Towards a Driver Support System for Teleoperated Driving", 2019 IEEE Intelligent Transportation Systems Conference (ITSC) (Year: 2019).

Paden, B., et al., "A Survey of Motion Planning and Control Techniques for Self-driving Urban Vehicles", IEEE Transactions on Intelligent Vehicles, vol. 1, Ids. 1, (Jun. 13, 2016).

Straub, J., "Comparing The Effect Of Pruning On A Best Path and a Naive-approach Blackboard Solver", International Journal of Automation and Computing (Oct. 2015).

Wuthishuwong, Chairit, et al., "Vehicle to Infrastructure based Safe Trajectory Planning for Autonomous Intersection Management", 2013 13th International Conference on ITS Telecommunications (ITST) (Year: 2013).

Crossman, Jacob, et al., "Method and System for Assessing and Mitigating Risks Encounterable by an Autonomous Vehicle", U.S. Appl. No. 18/538,312, filed Dec. 13, 2023.

\* cited by examiner

AUTONOMOUS VEHICLE SAFETY PLATFORM SYSTEM AND METHOD

CROSS REFERENCE TO RELATED APPLICATIONS

This application is a continuation of U.S. application Ser. No. 17/846,963, filed, 22 Jun. 2022, which is a continuation of U.S. application Ser. No. 17/550,461, filed, 14 Dec. 2021, which claims the benefit of U.S. Provisional Application Ser. No. 63/125,304, filed 14 Dec. 2020, each of which is incorporated herein in its entirety by this reference.

TECHNICAL FIELD

This invention relates generally to the autonomous vehicle field, and more specifically to a new and useful system and method for autonomous vehicle operation in the autonomous field.

BACKGROUND

Despite numerous recent advancements in the autonomous vehicle field, having a computer for the autonomous vehicle which is deemed auto-grade and which is resistant to failing has not been achieved. Since computing systems are integral to operation of autonomous vehicles, failure of the computing system can be catastrophic.

While high-level safety platforms (e.g., within a planning module of an autonomous vehicle) can create and implement backup trajectories with a computing system capable of assuring a minimum risk condition, these are essentially rendered useless in the event that the computing system loses communication with the vehicle's control system and/or encounters any other emergency scenarios.

Thus, there is a need in the autonomous vehicle field to create an improved and useful low-level safety platform system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
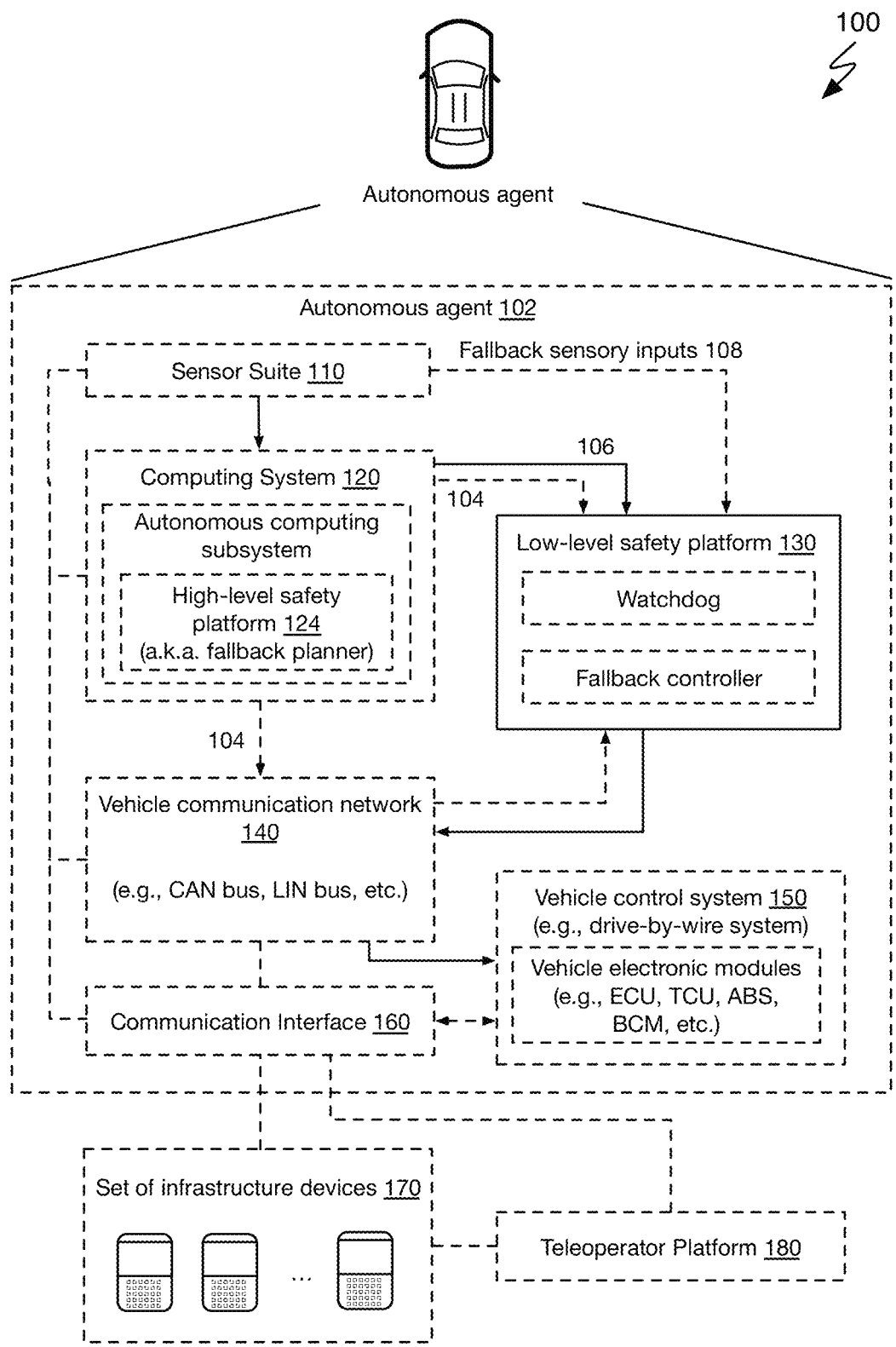
FIG. 1 is a schematic of a variant of a low-level safety platform system.

As shown in FIG. 1, the system 100 for autonomous vehicle operation includes a low-level safety platform 130. Additionally or alternatively, the system 100 can optionally include and/or interface with any or all of: an autonomous agent 102, a sensor system, a computing system 120, a vehicle communication network 140, a vehicle control system 150, and/or any suitable components. The optional sensor system can include: a sensor suite 110, a communication interface 160, a set of infrastructure devices 170, and a teleoperator platform 180. However, the system 100 can include any other additional components.

Further additionally or alternatively, the system 100 can include any or all of the components as described in any or all of: U.S. application Ser. No. 16/514,624, filed 17 Jul. 2019, now issued as U.S. Pat. No. 10,564,641; U.S. application Ser. No. 16/505,372, filed 8 Jul. 2019, now issued as U.S. Pat. No. 10,614,709; U.S. application Ser. No. 16/540,836, filed 14 Aug. 2019; and U.S. application Ser. No. 16/792,780, filed 17 Feb. 2020; each of which is incorporated herein in its entirety by this reference.

The system 100 functions to facilitate fallback planning and/or execution at the autonomous agent, in accordance with method S200. Additionally or alternatively, the system can function to transition the autonomous agent between a primary (autonomous) operation mode and a fallback operation mode. More preferably, the system 100 can function to enable operation (e.g., safe operation, optimal operation, operation along a prescribed route, etc.) of a vehicle in an event that a computing system of the vehicle (e.g., autonomous computing system) fails and/or loses communication abilities (e.g., with a control system of the vehicle, with actuators such as drive-by-wire actuators of the vehicle, etc.). However, the system can otherwise suitably function.

Figure 2:
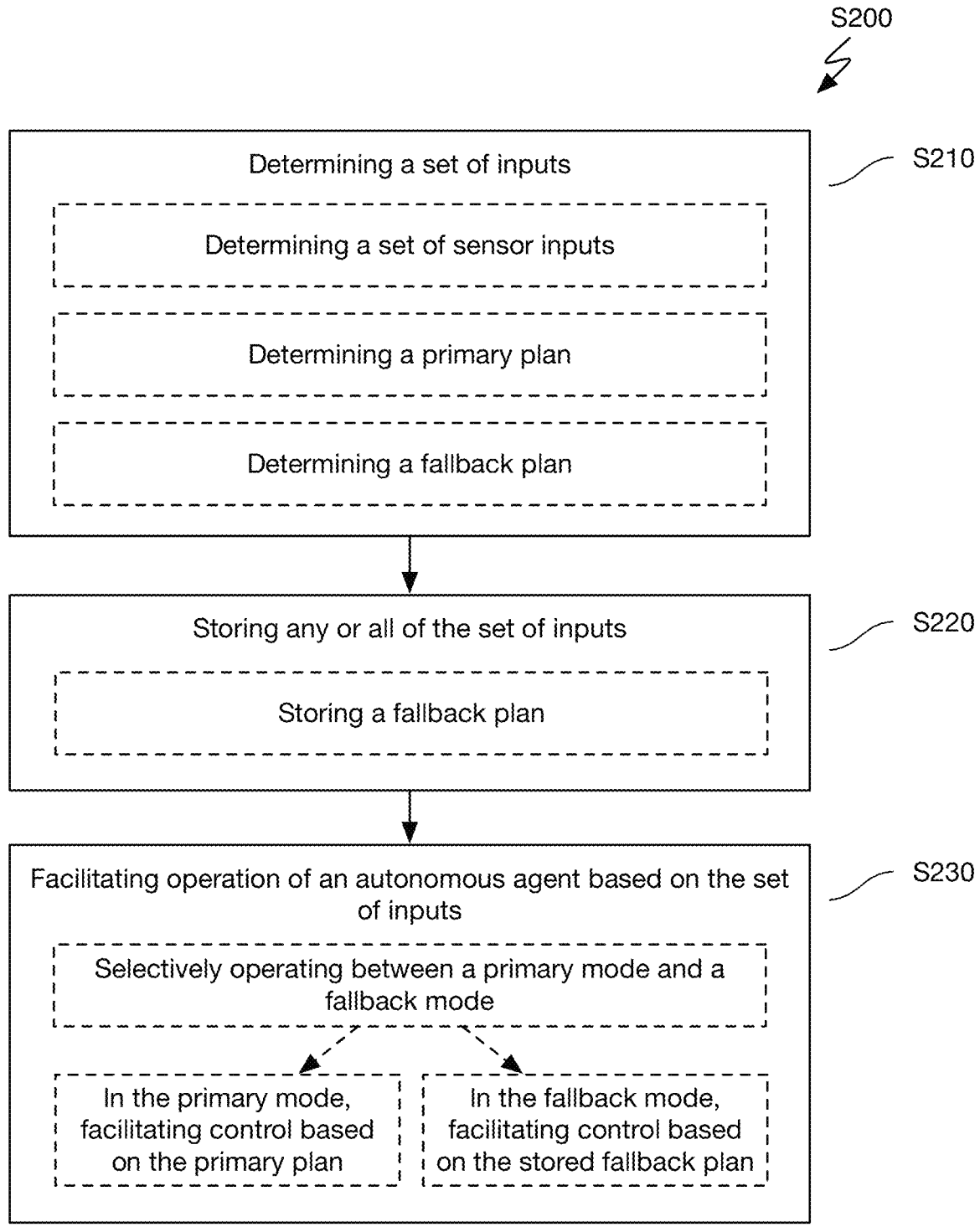
FIG. 2 is a schematic of a variant of a method for implementing a low-level safety operation of a vehicle.

As shown in FIG. 2, a method S200 for autonomous vehicle operation includes determining a set of inputs S210; storing any or all of the set of inputs S220; and facilitating operation of an autonomous agent based on the set of inputs S230.

Further additionally or alternatively, the method 200 can include any or all of the processes described in any or all of: U.S. application Ser. No. 16/514,624, filed 17 Jul. 2019, now issued as U.S. Pat. No. 10,564,641; U.S. application Ser. No. 16/505,372, filed 8 Jul. 2019, now issued as U.S. Pat. No. 10,614,709; U.S. application Ser. No. 16/540,836, filed 14 Aug. 2019; and U.S. application Ser. No. 16/792,780, filed 17 Feb. 2020; each of which is incorporated herein in its entirety by this reference, or any other suitable processes performed in any suitable order. The method 200 can be performed with a system 100 as described above and/or any other suitable system.

1.1 Examples.

In variants, the method S200 can include any or all of: retrieving a stored input; selecting and/or validating an input; in an event that communication with the computing system is present, transmitting a $1^{st}$ trajectory (equivalently referred to herein as a primary trajectory) to the communication network; in an event that communication with the computing system is lost, transmitting a $2^{nd}$ trajectory (equivalently referred to herein as a secondary trajectory) to the communication network; and/or any other suitable process(es) performed in any suitable order.

In one set of variants, an autonomous fallback method for a vehicle can include: receiving input data comprising sensor data from a sensor suite onboard the autonomous vehicle and an ego-vehicle state of the autonomous vehicle; based on the input data: determining a primary plan at an autonomous computing system; and determining a secondary plan, which can include: determining a set of navigational edge candidates, classifying a navigational edge candidate as available, and, based on the classification of the navigational edge as available, generating the second plan based on the ego-vehicle state and the navigational edge candidate; storing the secondary plan at a memory coupled to an embedded controller; autonomously controlling the vehicle based on the primary plan; and while autonomously controlling the vehicle based on the primary plan, determining satisfaction of a trigger condition and, in response, autonomously controlling the vehicle based on the secondary plan with the embedded controller.

In some variants, the autonomous fallback method can further include: while controlling the vehicle based on the primary plan, updating the secondary plan based on a satisfaction of an expiration condition of the secondary plan.

In some variants, the autonomous fallback method can further include, while controlling the vehicle based on the secondary plan: estimating an ego-vehicle pose using odometry; based on the ego-vehicle pose with a set of secondary sensors, detecting an obstacle along a path of the vehicle corresponding to the secondary plan; and executing a full stop based on the obstacle detection. In an example, the set of secondary sensors can include time-of-flight sensors of the vehicle sensor suite.

In some variants of the autonomous fallback method, the available state classification can be based on a map.

In some variants of the autonomous fallback method, the input data comprises an environmental representation which identifies a set of agents (e.g., in an environment of the ego agent), wherein the available state classification is based on an occupancy prediction corresponding to each agent of the set. In an example, each agent is assumed to be static within a planning horizon. In another example, any or all of the agents are assumed to be dynamically moving with a planning horizon.

In some variants of the autonomous fallback method, the available state classification is based on an ego-vehicle dimension and a satisfaction of a minimum passing clearance. In additional or alternative variations, the available state classification is based on a presence or predicted presence of a neighboring vehicle between the ego vehicle and the state (e.g., a navigational edge associated with the state).

In some variants of the autonomous fallback method, the set of navigational edge candidates are determined at a predetermined set of distances relative to an ego-vehicle position.

In some variants, the autonomous fallback method can further include: selecting the navigational edge from a plurality of available navigational edges based on at least one of: collision constraints, kinematic constraints, and a minimum distance constraint.

In some variants of the autonomous fallback method, the trigger condition is a communication lapse between the autonomous computing system and a validation endpoint. In one example, the validation endpoint is a communication network node.

Figure 6:
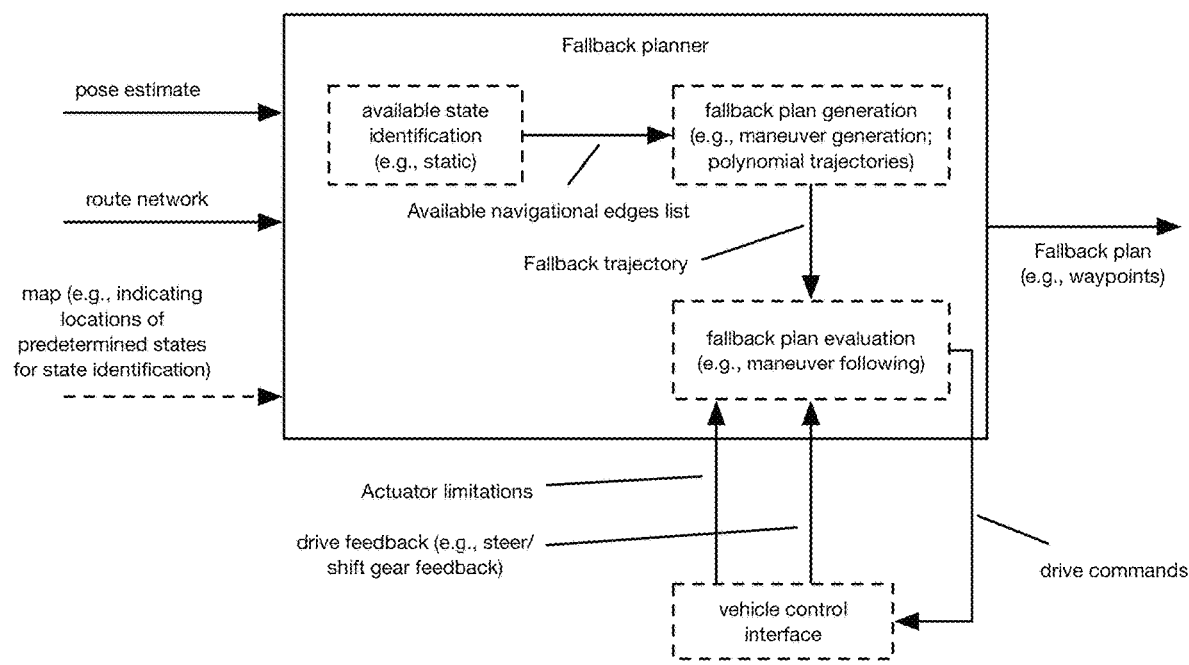
FIG. 6 is a schematic representation of a variant of a fallback planner in one variant of the system.
Figure 7:
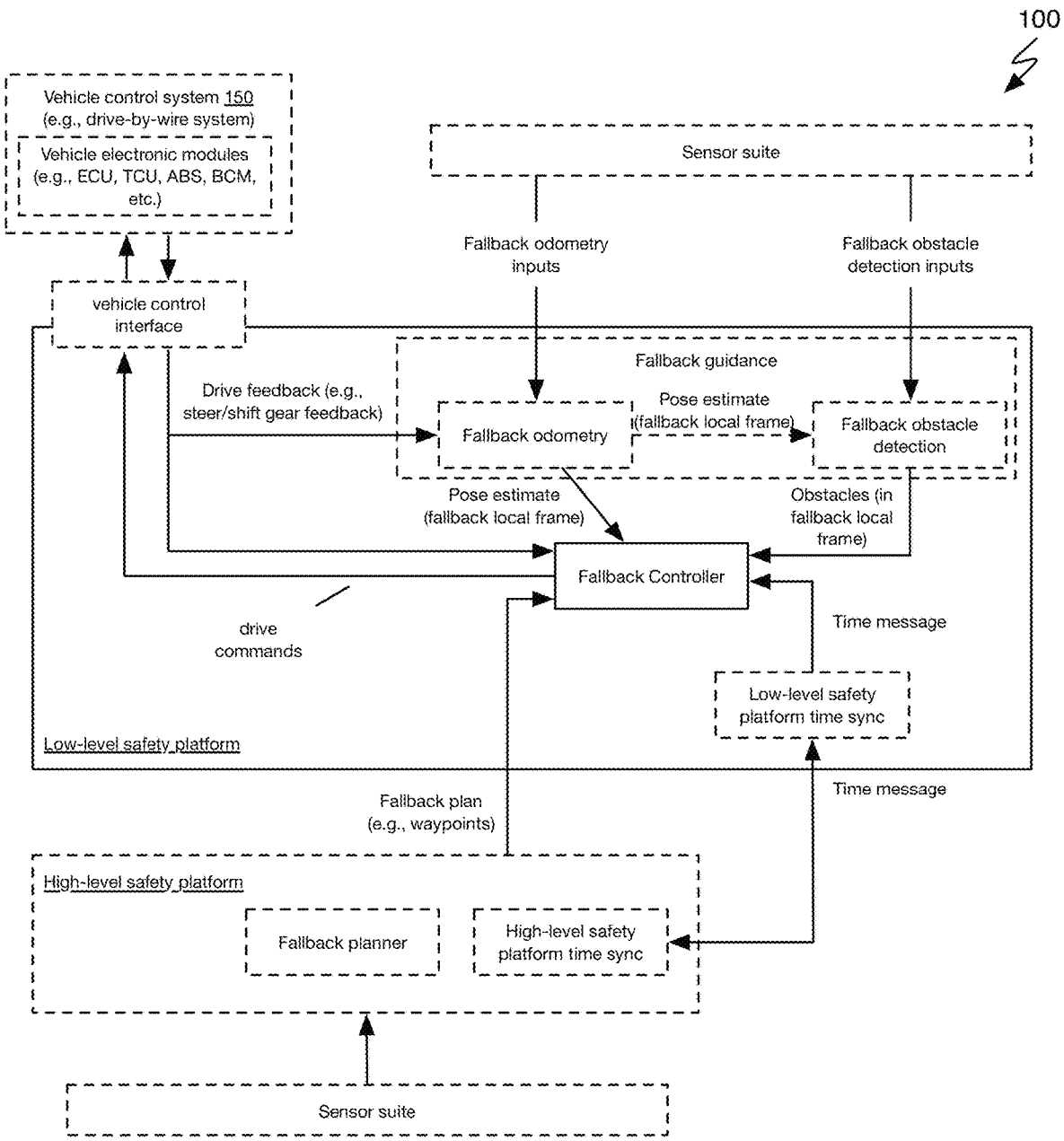
FIG. 7 is a schematic representation of a variant of a low-level safety platform system.

In some variants of the autonomous fallback method, the embedded controller is within a low-level safety platform which is communicatively connected to the autonomous computing system and a vehicle communication network. In an example, autonomously controlling the vehicle based on the primary plan includes providing a trajectory to a vehicle control system via the low-level safety platform and the vehicle communication network (e.g., through a vehicle control interface as shown in FIGS. 6 and 7). Alternatively, the primary trajectory is provided to a vehicle control system without passing through the low-level safety platform.

2. Benefits

The autonomous vehicle safety platform system and method can confer several benefits over current systems and methods.

First, variations of the technology can provide increased safety of an autonomous agent as it navigates through its environment, even if the (autonomous) computing system of the agent fails and/or loses communication with other components of the autonomous agent. In specific examples, a set of safety trajectories for an environment of the agent can generated prior to communication/processing failures, which can be relied upon in a fallback mode and/or implemented in case of communication/processing failures (of the autonomous computing system). However, variations can otherwise provide increased safety.

Second, variations of the technology can provide a low-level safety platform which can be integrated in a modular fashion into any number of vehicles, such as autonomous agents. In variants, the low-level safety platform can be separately integrated from an autonomous computing system, such as added as a retro-fit platform and/or scaled to meet a degree of fallback and/or computing redundancy. However, variants of the system can be otherwise suitably integrated into a vehicle and/or the low-level safety platform can be otherwise implemented.

Figure 5:
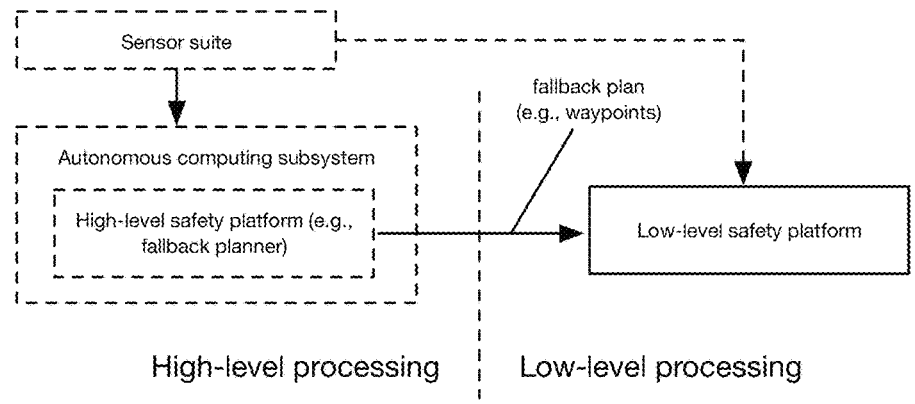
FIG. 5 is a schematic representation of a variant of a low-level safety platform system.

Third, variations of the technology can provide fallback planning without the use of redundant autonomous processing systems, which may rely on costly and/or resource intensive hardware (e.g., reserving/requiring additional compute capabilities for failure responses; increase hardware costs; increasing the amount of advanced processing capabilities; etc.). As an example, variants can facilitate vehicle resilience to hardware and/or communication failures while relying on only a single advanced processing system (e.g., exactly one computing system and/or autonomous computing subsystem therein). Instead of relying on redundant autonomous processing, variants can utilize a fallback controller (e.g., an embedded controller), which can operate with low-level processing at a low-level safety system (e.g., an example is shown in FIG. 5). However, variants can otherwise provide fallback planning and/or resilience to communication and/or autonomous processing failures.

Fourth, variations of the technology can provide technical solutions necessarily rooted in computer technology to overcome issues specifically arising with computer technology, such as fallback planning, redundancy, computing failure resilience of autonomous vehicle planning/control, and/or other computer technology challenges. In addition, or alternative to autonomous vehicle applications, the system and/or method can be used in any or all of a numerous set of applications, such as but not limited to, any or all: military applications, aircraft control, and/or any other suitable applications.

Additionally or alternatively, the system and method can confer any other benefit(s).

3. System 100

The system 100 functions to facilitate fallback planning and/or execution at the autonomous agent, in accordance with method S200. Additionally or alternatively, the system can function to transition the autonomous agent between a primary (autonomous) operation mode and a fallback operation mode. More preferably, the system 100 can function to enable operation (e.g., safe operation, optimal operation, operation along a prescribed route, etc.) of a vehicle in an event that a computing system of the vehicle (e.g., autonomous computing system) fails and/or loses communication abilities. However, the system can otherwise suitably function. Additionally or alternatively, the system can function to detect these failures and/or communication losses, retrieve trajectories, store trajectories, generate trajectories, and/or perform any other suitable functions.

The system 100 preferably operates in accordance with the method 200 as described below, but can additionally or alternatively be performed in accordance with any other suitable method(s). Further additionally or alternatively, the system 100 can function to perform any or all of the methods, processes, embodiments, and/or examples described in any or all of: U.S. application Ser. No. 16/514,624, filed 17 Jul. 2019, now issued as U.S. Pat. No. 10,564,641; U.S. application Ser. No. 16/505,372, filed 8 Jul. 2019, now issued as U.S. Pat. No. 10,614,709; U.S. application Ser. No. 16/540,836, filed 14 Aug. 2019; and U.S. application Ser. No. 16/792,780, filed 17 Feb. 2020; each of which is incorporated herein in its entirety by this reference.

3.1 System: Components

Figure 4:
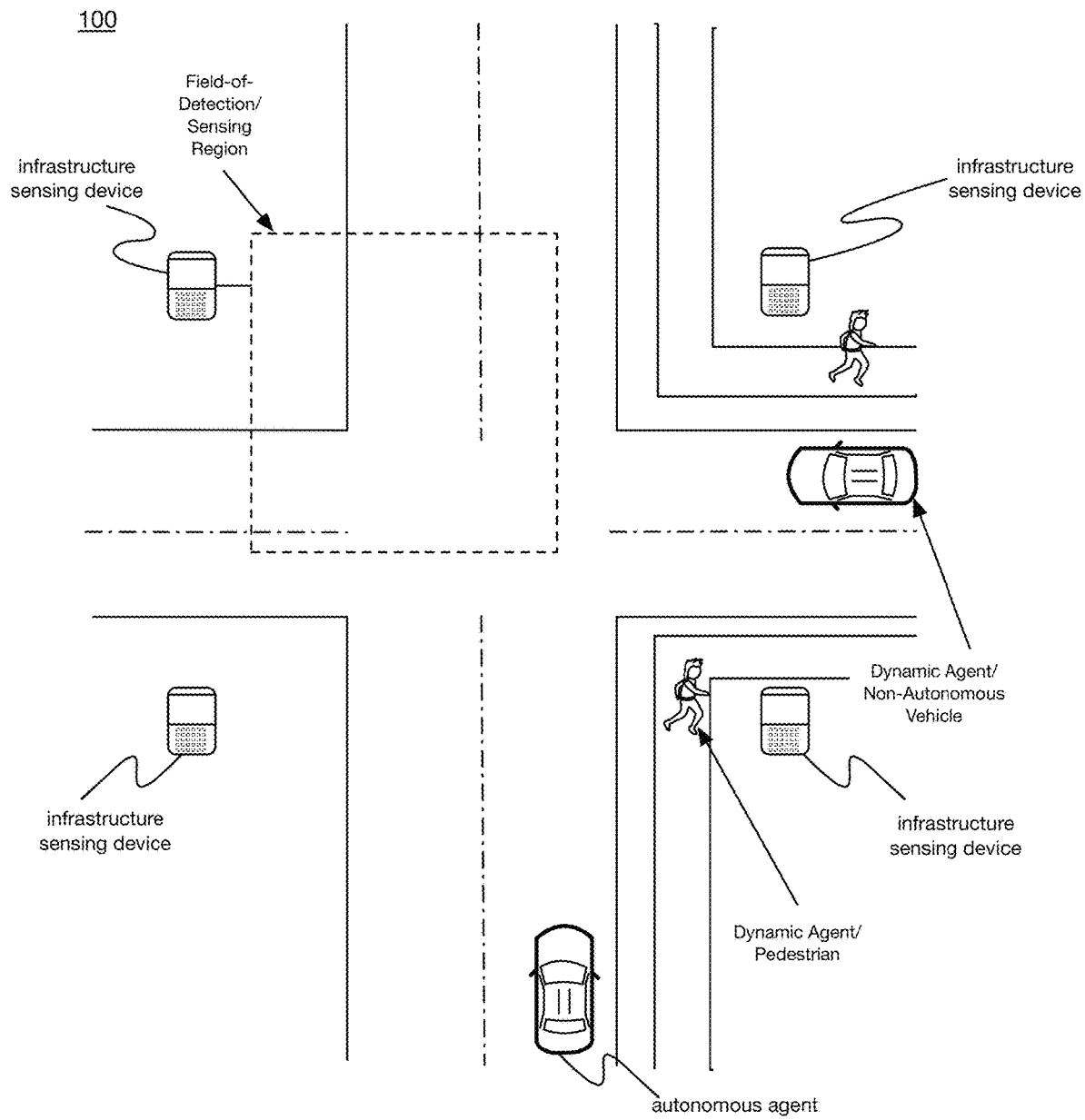
FIG. 4 is a schematic variation of a vehicle in its environment.

The system 100 preferably includes and/or interfaces with (e.g., is integrated within) an autonomous vehicle (equivalently referred to herein as an autonomous agent 102 and/or an ego vehicle) (e.g., as shown in FIG. 4). The autonomous agent 102 preferably includes an autonomous vehicle 110 that is preferably a fully autonomous vehicle and/or able to be operated as a fully autonomous vehicle, but can additionally or alternatively be any semi-autonomous vehicle.

In some examples, for instance, the autonomous agent can be a vehicle that switches between a semi-autonomous state (e.g., which interfaces with a human safety driver, which interfaces with a teleoperator, etc.) and a fully autonomous state (or a fully-manned state) and thus, the autonomous agent can have attributes of both a semi-autonomous vehicle and a fully autonomous vehicle depending on the state of the autonomous agent.

In preferred variations, the autonomous vehicle is an automobile (e.g., car, driverless car, bus, shuttle, taxi, rideshare vehicle, truck, semi-truck, etc.). Additionally or alternatively, the autonomous vehicle can include any or all of: a watercraft (e.g., boat, water taxi, etc.), aerial vehicle (e.g., plane, helicopter, drone, etc.), terrestrial vehicle (e.g., 2-wheeled vehicle, bike, motorcycle, scooter, etc.), and/or any other suitable vehicle and/or transportation device, autonomous machine, autonomous device, autonomous robot, and/or any other suitable device.

The autonomous agent preferably includes and/or interfaces with a computing system 120, wherein the computing system functions to process information (e.g., sensor inputs) in order to determine a set of one or more trajectories (e.g., primary trajectories, secondary trajectories, etc.) for the vehicle. Additionally or alternatively, the computing system can function to perform any or all of the processes involved in any or all of: perception, prediction, localization, planning, and/or any other processes involved in operation of the autonomous agent.

The computing system preferably includes an onboard computing system arranged onboard (e.g., integrated within) the autonomous agent. Additionally or alternatively, the computing system can include any or all of: a remote computing system (e.g., cloud computing system, remote computing in communication with an onboard computing system, in place of an onboard computing system, etc.), a computing system integrated in a supplementary device (e.g., mobile device, user device, etc.), an edge device including mobile computing devices, sensor with integrated computing units, multiple computing systems (e.g., one which generates primary trajectories and another which generates secondary trajectories) and/or any other suitable computing systems and devices. In some variations, for instance, the autonomous agent is operable in communication with a remote or disparate computing system that may include a user device (e.g., a mobile phone, a laptop, etc.), a remote server, a cloud server, or any other suitable local and/or distributed computing system remote from the vehicle. The remote computing system can be connected to one or more systems of the autonomous agent through one or more data connections (e.g., channels), but can alternatively communicate with the vehicle system in any suitable manner.

The computing system preferably includes a processing system (e.g., graphical processing unit or GPU, central processing unit or CPU, or any suitable processing circuitry) and memory, but can additionally or alternatively include any other suitable components. The memory can be short term (e.g., volatile, non-volatile, random access memory or RAM, etc.) and/or long term (e.g., flash memory, hard disk, etc.) memory. In some variations, for instance, the onboard computing system operates to interact with and/or operably control one or more of the identified components or modules described herein. For instance, the onboard computing system can function to implement and/or execute computer instructions for implementing a multi-policy decision making module, a synchronization module, and/or the like. In specific examples, the processing system and memory collectively function to dynamically manage the set of policies available to the autonomous agent (e.g., determined based on the method 200) in the framework of a multi-policy decision making framework, such as that described in U.S. application Ser. No. 16/514,624, filed 17 Jul. 2019, which is incorporated herein in its entirety by this reference. Additionally or alternatively, the processing system and memory, and/or any other suitable components, can be used for any other suitable functions.

The computing system (e.g., onboard computing system) preferably functions to control the autonomous agent and process sensed data from a sensor suite 110 (e.g., a computer vision system, LIDAR, flash LIDAR, wheel speed sensors, GPS, etc.) of the autonomous agent and/or other sensors (e.g., from infrastructure devices) to determine states of the autonomous agent and/or states of agents in an operating environment of the autonomous agent. Based upon the states of the autonomous agent and/or agents in the operating environment and programmed instructions, the onboard computing system preferably modifies or controls behavior of autonomous agent, such as through the selection of a behavioral policy (e.g., which is then used to determine a primary trajectory). Additionally, or alternatively, the computing system can include a multi-policy decision-making module that functions to generate behavioral policies and select a behavioral policy (e.g., change lanes, merge, maintain current lane, turn left, turn right, pull over, slow down, speed up, stop at light, stop at stop sign, yield, etc.) that the computing system can execute to control a behavior of the autonomous agent (e.g., through the determination of a primary trajectory).

The outputs of the computing system (e.g., and/or autonomous processors therein) can include preferably behavioral policies and/or operational instructions which can include vehicle waypoints (e.g., in a local ego-vehicle frame), a target vehicle path (e.g., spatiotemporal control path), a polynomial path, trajectories (e.g., in the form of low-level control commands, such as raw actuator control commands associated with follow a path/waypoint), but can additionally or alternatively include any other information. In preferred variants, the computing system is configured to output a 1st set of outputs 104 (e.g., a primary plan) and a $2^{nd}$ set of outputs 106 (e.g., a fallback plan), which can be in the same format or a different format. As an example, the $1^{st}$ set of outputs (e.g., a primary plan) can be a trajectory (e.g., path, set of positions, low level actuation commands, etc.) and the $2^{nd}$ set of outputs can be in the form of high-level guidance (e.g., waypoints, a target vehicle path, etc.). However, the computing system can provide any suitable outputs to any suitable endpoints.

The computing system preferably includes, defines, interfaces with, and/or acts as a high-level safety platform 124 (a.k.a. a fallback planner), wherein the high-level safety platform is capable of planning and configured to generate a $2^{nd}$ set of outputs 106 (e.g., as described below), equivalently referred to herein as a fallback plan (e.g., waypoints, a fallback trajectory), wherein one of the $2^{nd}$ set of outputs can be utilized for vehicle operation in response to a satisfaction of a fallback condition (e.g., event of an emergency; communication failure; failure of the computing system; etc.). Additionally or alternatively, the high-level safety platform can be defined by other components and/or otherwise configured.

In a first set of variations, the computing system includes an onboard general-purpose computer adapted for I/O communication with vehicle control systems and sensor systems but may additionally or alternatively be any suitable computing device. The onboard computing system is preferably connected to the Internet via a wireless connection (e.g., via a cellular link or connection). Additionally, or alternatively, the onboard computing system can be coupled to any number of wireless or wired communication systems.

However, the system can include or be used with any other suitable computing system; or can be otherwise suitably implemented.

The system 100 can optionally include a communication interface 160 in communication with the computing system, which functions to enable information to be received at (e.g., from infrastructure devices, from a remote computing system and/or remote server, from a teleoperator platform, from another autonomous agent or other vehicle, etc.) and transmitted from the computing system (e.g., to a remote computing system and/or remote server, to a teleoperator platform, to an infrastructure device, to another autonomous agent or other vehicle, etc.). The communication interface preferably includes a wireless communication system (e.g., Wi-Fi, Bluetooth, cellular 3G, cellular 4G, cellular 5G, multiple-input multiple-output or MIMO, one or more radios, or any other suitable wireless communication system or protocol), but can additionally or alternatively include any or all of: a wired communication system (e.g., modulated powerline data transfer, Ethernet, or any other suitable wired data communication system or protocol), a data transfer bus (e.g., CAN, FlexRay), and/or any other suitable components. However, the system can include or be used with any other suitable communication interface; or can otherwise exclude a communication interface.

The system 100 can optionally include a set of infrastructure devices 170 (e.g., as shown in FIG. 4), equivalently referred to herein as roadside units, which individually and/or collectively function to observe one or more aspects and/or features of an environment and collect observation data relating to the one or more aspects and/or features of the environment. In preferred variations, the infrastructure devices additionally function to collect data associated with the observations and transmit the collected data and/or processed derivatives of the collected data to the autonomous agent. Additionally or alternatively, the infrastructure devices can function to collect and transmit data to a teleoperator platform, wherein the teleoperators can use the data to inform decision making of a teleoperator, such as whether to include and/or exclude a behavioral policy from consideration by the computing system of the autonomous agent. In a specific example, for instance, an infrastructure device can enable a view around a corner of the vehicle to be seen, which the agent and/or an operator and/or a teleoperator of the agent can use to enable a turning behavioral policy to be considered by the autonomous agent (by seeing that the road is clear for a turn).

In a first set of variations, for instance, the infrastructure devices forward the collected observations data to an autonomous vehicle service and/or remote platform (e.g., implemented via a network of distributed computing systems) that operates to interactively communicate with and/or control one or more functions of the autonomous agent.

The infrastructure devices preferably include devices in an immediate and/or close proximity or within short-range communication proximity to an operating position of an autonomous agent and can function to collect data regarding circumstances surrounding the autonomous agent and in areas proximate to a zone of operation of the autonomous agent. In some embodiments, the roadside units include one or more of offboard sensing devices including flash LIDAR, thermal imaging devices (thermal cameras), still or video capturing devices (e.g., image cameras and/or video cameras, etc.), global positioning systems, radar systems, microwave systems, inertial measuring units (IMUs), and/or any other suitable sensing devices or combination of sensing devices.

The infrastructure devices can optionally include computing capabilities via processing circuitry and a communication interface that enables the infrastructure devices to communicate with any or all of: a computing system of the autonomous agent, a remote computing system, a teleoperator platform, and/or any other suitable components or combination of components.

A zone of operation of the autonomous agent can optionally be defined as a predefined radius (e.g., 100 feet, between 50 feet and 100 feet, less than 50 feet, between 100 feet and 200 feet, greater than 200 feet, etc.) along a structured and/or unstructured route of the autonomous agent at any point along the structured route at which the autonomous agent 110 is positioned and/or operating (e.g., driving). In a specific example of a structured and/or predefined autonomous agent route, the proximate zone of operation of the autonomous agent is 100 feet from or along any point along the structured route.

A technical benefit achieved by the implementation of the infrastructure devices can include an ability to observe circumstances (e.g., around corners, down perpendicular streets, etc.) beyond the observable scope of the autonomous agent, which can subsequently function in the curation of one or more behavioral policies available to the agent. At a given instance in time, for example, observations of one or more aspects of a given environment may be made by an autonomous agent and observations of one or more different and/or overlapping aspects of the given environment may be made from a different perspective by one or more infrastructure devices arranged and operating in the given environment. In such embodiments, the perspective of the infrastructure devices, including the observation data therefrom, may be augmented to observation data from the perspective of the autonomous agent to generate a comprehensive perspective of the operating environment of the autonomous agent and/or to provide an additional view to one or more teleoperators of a teleoperator platform. This can enable improved predictions of the operating environment to be made and improved behavioral policy decisions (e.g., plans/trajectories) to be selected and/or executed by the autonomous agent for operating independently (of an onboard human operator) and safely within the operating environment.

In some variations, the autonomous agent can augment and/or fuse data derived by an onboard sensor suite 110 (e.g., as described below) with additional observations from the infrastructure devices (e.g., the roadside units) to improve policy curation and/or trajectory determination by the autonomous agent.

Additionally or alternatively, the infrastructure devices can detect and track any type or kind of objects in an operating environment, such as with a video camera or radar. In some variations, for instance, a video camera can function to provide detection of objects and semantic classification of the object type and possible intent of an object, such as a pedestrian that is about to cross a road, or a car that is about to make a left turn, a driver which is about to open a car door and exit their vehicle, a bicyclist operating in a bike lane, and/or any other suitable information.

Further additionally or alternatively, any or all of the infrastructure devices can include traffic management devices (e.g., traffic sensors, traffic lights, pedestrian lights, etc.) or the like operating in the environment that may function to communicate with any or all of: other infrastructure devices (e.g., roadside units); directly with the autonomous agent regarding any or all of: data collected and/or sensed by the infrastructure device, regarding an operating state of the infrastructure device (e.g., red or green traffic light), and/or any other information; directly with a teleoperator platform; and/or can communicate in any other suitable way. In a specific example, a traffic light can be an infrastructure device in an environment surrounding the autonomous vehicle that may function to communicate directly to the autonomous vehicle or to a roadside unit that may be in operable communication with the autonomous vehicle. In this example, the traffic light can function to share and/or communicate operating state information, such as a light color that the traffic light is projecting, or other information, such as a timing of the light changes by the traffic light, and/or the like.

However, the system can include or be used with any other suitable infrastructure devices; or can exclude infrastructure devices.

In preferred variations, the communication interface 160 enables the autonomous agent to communicate and/or exchange data with systems, networks, and/or devices external to the autonomous agent. This communication interface and/or a separate communication interface can optionally enable one or more infrastructure devices to communicate directly with the autonomous agent and/or with a remote computing system and/or with a teleoperator platform. Further additionally or alternatively, the communication interface can enable communication to be established between multiple components of the system and/or agent. The communication interface(s) preferably include one or more of a cellular system (or any suitable long-range communication system), direct short-wave radio, or any other suitable short-range communication system.

The communication interface can optionally include, be used in conjunction with, and/or define a vehicle communication network 140, wherein the vehicle communication network functions to enable different components of the autonomous agent to receive and transmit information among each other. The vehicle communication network can be any or all of: manufactured with the vehicle (e.g., an Original Equipment Manufacturer [OEM] communication network), added to the vehicle (e.g., retrofitted), any combination, and/or otherwise added.

In preferred variations, the vehicle communication network is a vehicle bus, such as, but not limited to, any or all of: a bus (e.g., a Controller Area Network (CAN) bus, a Local Interconnect Network (LIN) bus, etc.), ethernet, any combination, and/or any other communication network.

In specific examples, the vehicle communication network includes a CAN bus which is in communication with the computing system via the low-level safety platform.

However, the system can include or be used with any other suitable vehicle communication network and/or can otherwise exclude a vehicle communication network.

The system preferably includes and/or interfaces with a sensor suite 110 (e.g., computer vision system, LIDAR, RADAR, wheel speed sensors, GPS, cameras, inertial measurement unit [IMU], etc.), wherein the sensor suite (equivalently referred to herein as a sensor system) is in communication with the onboard computing system and functions to collect information with which to determine one or more trajectories for the autonomous agent. The sensor system (and/or a portion of it) can additionally or alternatively be in communication with any other components of the system, such as the low-level safety platform (e.g., such that the fallback controller can receive a simple subset of information to perform odometry and/or simple obstacle detection while implementing a secondary trajectory), and/or any other components. Additionally or alternatively, the sensor suite can function to enable the autonomous agent operations (such as autonomous driving), data capture regarding the circumstances surrounding the autonomous agent, data capture relating to operations of the autonomous agent, detecting maintenance needs (e.g., through engine diagnostic sensors, exterior pressure sensor strips, sensor health sensors, sensor signal quality self-diagnosis and/or cross-sensor diagnosis, etc.) of the autonomous agent, detecting cleanliness standards of autonomous agent interiors (e.g., internal cameras, ammonia sensors, methane sensors, alcohol vapor sensors), and/or perform any other suitable functions.

The sensor suite 110 preferably includes sensors onboard the autonomous vehicle (e.g., RADAR sensors and/or LIDAR sensors and/or cameras coupled to an exterior surface of the agent, IMUs and/or encoders coupled to and/or arranged within the agent, etc.), but can additionally or alternatively include sensors remote from the agent (e.g., as part of one or more infrastructure devices, sensors in communication with the agent, etc.), and/or any suitable sensors at any suitable locations.

However, the system can include or be used with any other suitable sensor system(s) and/or sensor suite; or can be otherwise suitably implemented.

The system can include and/or interface with a vehicle control system 150 including vehicle modules/components which function to effect vehicle motion based on the operational instructions (e.g., plans and/or trajectories) generated by one or more computing systems and/or controllers.

Additionally or alternatively, the vehicle control system can include, interface with, and/or communicate with any or all of a set electronic modules of the agent, such as but not limited to, any or all of: component drivers, electronic control units [ECUs], telematic control units [TCUs], transmission control modules [TCMs], antilock braking system [ABS] control module, body control module [BCM], and/or any other suitable control subsystems and/or modules. In preferred variations, the vehicle control system includes, interfaces with, and/or implements a drive-by-wire system of the vehicle. Additionally or alternatively, the vehicle can be operated in accordance with the actuation of one or more mechanical components, and/or be otherwise implemented. However, the system can include or be used with any other suitable vehicle control system; or can be otherwise suitably implemented.

The system 100 preferably includes a low-level safety platform 130 (e.g., as described below), which functions to process, transmit, and/or store a set of inputs involved in trajectory selection and/or trajectory generation of the vehicle. Additionally or alternatively, the low-level safety platform functions to facilitate execution of all or a portion of the method S200.

The low-level safety platform is preferably in communication with the computing system and the vehicle communication network (e.g., CAN bus, ethernet, etc.). In a first set of variants, the low-level safety platform can relay information between the computing system and the vehicle communication network (e.g., from the computing system to the vehicle communication network, from the vehicle communication network to the computing system, etc.). In a second set of variants, the low-level safety platform can transform information (e.g., $2^{nd}$ set of outputs of the computing system) and provide a corresponding set of outputs (e.g., to the vehicle control system, via the vehicle communication network, via a vehicle control interface, etc.).

Additionally or alternatively, the low-level safety platform can be implemented in a parallel embodiment (e.g., with 2 parallel communications busses) wherein in addition or alternative to relaying information and/or arbitrating messages, the low-level safety platform is configured to step to implement a fallback controller (e.g., if the computing system is not communicating, wherein the system and the autonomy compute can control the same vehicle and communicate with each other to detect the need for switching to the backup control, etc.).

In preferred variations, the low-level safety platform can provide one or more trajectories (and/or any other plan(s)) to the vehicle communication network (e.g., in a nominal operating mode and/or in a fallback operation mode), wherein the information is subsequently transmitted to the vehicle control system for implementation. These outputs can optionally be provided to the vehicle control system through a vehicle control interface (e.g., as shown in FIGS. 6 and 7), which preferably includes a software module that serves as the interface between the vehicle control system (e.g., drive-by-wire ECU) and the autonomy stack of the vehicle's computing system (e.g., including the low-level safety platform, including the high-level safety platform, etc.). Additionally or alternatively, the low-level safety platform can directly and/or indirectly be in communication with the control system and/or with any other components of the system (e.g., sensor system, etc.). In some variations, for instance, the low-level safety platform is directly in communication with the vehicle control system. In additional or alternative variations, the low-level safety platform is in communication with at least a subset of sensors of the sensor system (e.g., IMU and encoder, only IMU and encoder, only a subset, etc.), wherein the low-level safety platform can use sensor inputs for any or all of: validating one or more received trajectories, generating its own trajectory in an event of an emergency (e.g., computing system lost connection), modifying a trajectory (e.g., based on a detected object in the vehicle's path; implementing a full stop/hard stop in the event of an obstacle detection); implementing any suitable minimal risk condition (MRC); and/or performing any other suitable functions. Additionally or alternatively, the low-level safety platform can: produce its own outputs based on the set of inputs (e.g., by modifying the set of inputs based on sensor information; generating its own trajectory; determining a full stop trajectory, etc.); select one or more inputs to transmit; store one or more inputs (e.g., in temporary storage, in permanent storage, etc.); evaluate one or more inputs (e.g., to see if it is within a predetermined threshold such as a time and/or distance threshold since being created); and/or perform any other processes.

The low-level safety platform preferably includes and/or is used in conjunction with a fallback controller (e.g., an example is shown in FIG. 7) which functions to store one or more operation plans (e.g., fallback plans; $2^{nd}$ set of outputs 106; received from the computing system in a nominal operation mode), and/or retrieve one or more operation plans (e.g., from prior storage during a nominal operation mode; when operating in a fallback mode); optionally generate instructions (e.g., a trajectory, set of waypoints, etc.) based on a stored fallback plan; and transmit the instructions associated with the fallback plan. Instructions can herein refer to any or all of: a trajectory, path (e.g., a polynomial path), a set of positions (e.g., a set of waypoints), a set of control commands for actuators of the vehicle (e.g., to reach a destination, to follow the path, to follow the set of points, to stop, to executing an MRC, etc.), and/or any other suitable information associated with driving the vehicle. The fallback controller is preferably an embedded controller (e.g., embedded within the low-level safety platform), but can likewise be an auxiliary controller which is separate and distinct from a primary controller of the computing system (e.g., packaged within a separate module, communicatively decoupled, relying on a separate processing system, etc.), secondary controller (e.g., redundant with a primary autonomy controller), and/or any other suitable fallback controller.

In specific examples, the (embedded) fallback controller is not configured to perform vehicle path planning or trajectory generation, however the fallback controller can additionally or alternatively be configured to generate instructions (e.g., control commands, paths, trajectories, etc.) based on high-level guidance plans (e.g., waypoints, a vehicle path plan, etc.), modify maneuvers/path plans (e.g., execute a full stop in response to obstacle detection), and/or can be configured to perform any other suitable operations.

Additionally or alternatively, the low-level safety platform and/or one or more controllers therein can function to implement software algorithms and/or machine learning techniques to assist the functionality of the controller, such as feature detection/classification, obstruction mitigation, route traversal, mapping, sensor integration, ground-truth determination, and/or enable any other suitable functionalities. The controller can include any suitable software and/or hardware components (e.g., processor and computer-readable storage device) utilized for generating control signals for controlling the autonomous agent according to a routing goal of the autonomous agent and selected behavioral policies and/or a selected trajectory of the autonomous agent.

Additionally or alternatively, the low-level safety platform can include multiple (embedded) fallback controllers (e.g., for redundancy, in communication with each other, etc.). As an example, the low-level safety system can include an array of redundant fallback controllers arranged in parallel, which can each be redundantly connected to any suitable vehicle control endpoints. Additionally or alternatively, the low-level safety platform can include any suitable controllers (e.g., microcontrollers), processors (e.g., microprocessors), and/or any suitable components with any suitable functionality.

The system (and/or low-level safety platform thereof) can optionally include or be used with (e.g., in communication with) a watchdog (a.k.a., verification or validation module) which functions to detect fallback events (e.g., satisfaction of a fallback condition) and, in response, transition the autonomous agent and/or low-level safety platform to a fallback mode (e.g., and out of a nominal operation mode). Additionally or alternatively, the watchdog can function to validate: functionality of the autonomous operating system, that primary trajectories/control commands are being communicated via the communication system; and/or that guidance plans (e.g., primary and/or fallback) satisfy a set of rules/conditions. However, the system and/or low-level safety platform can otherwise exclude a watchdog; a watchdog can be implemented at a separate node of the system (e.g., separate from both the computing system and the low-level safety platform), and/or the low-level safety platform can otherwise transition into a fallback mode.

However, the system can include any other suitable low-level safety platform.

Additionally or alternatively, the system can include any or all of: a sensor fusion system, a positioning system (e.g., including location sensors of the sensor system), a guidance system, and/or any suitable components. In some variations, for instance, the sensor fusion system synthesizes and processes sensor data and together with a multi-policy decisioning module predicts the presence, location, classification, and/or path of objects and features of the environment of the autonomous agent. In various embodiments, the sensor fusion system may function to incorporate data from multiple sensors and/or data sources, including but not limited to cameras, LIDARS, radars, infrastructure devices, remote data feeds (Internet-based data feeds), and/or any number of other types of sensors.

The positioning system processes sensor data along with other data to determine a position (e.g., a local position relative to a map, an exact position relative to lane of a road, vehicle heading, velocity, etc.) of the autonomous agent relative to the environment, which can function to determine what behavioral policies are available to the autonomous agent (e.g., as described below). The guidance system can process sensor data along with other data to determine a path for the vehicle to follow.

The system can optionally interface with a teleoperator platform 180, which refers to one or more remote teleoperators and associated components (e.g., communication interface with autonomous agent, computing system, output devices for displaying information from autonomous agents and/or infrastructure devices to teleoperators, input devices for receiving instructions/commands from teleoperators, etc.). The teleoperator platform can function to receive inputs from teleoperators, which can be used at least partially in the determination of the curated behavioral policies for the vehicle.

In a first variation of the system 100, the system includes a low-level safety platform in communication with a computing system of the vehicle and a vehicle communication network, wherein the low-level safety platform transmits a $1^{st}$ set of outputs 104 (e.g., a primary plan/trajectory) from the computing system to the vehicle communication network, wherein the $1^{st}$ set of outputs (and/or actuator control commands associated with the $1^{st}$ set of outputs) are subsequently transmitted to a drive-by-wire control system of the vehicle, and wherein in an event that a trigger condition occurs (e.g., the low-level platform loses communication with the computing system; the low-level safety platform detects inconsistencies and/or errors in the trajectory and/or control commands (or any other instructions) transmitted by the computing system; etc.) transmits a retrieved trajectory from a $2^{nd}$ set of outputs 106 to the vehicle communication network.

In a second variation of the system 100, the system includes a low-level safety platform in communication with a computing system of the vehicle and a vehicle communication network, the computing system provides transmits a $1^{st}$ set of outputs 104 (e.g., a primary plan/trajectory) to the vehicle communication network (e.g., in a nominal operating mode), wherein the $1^{st}$ set of outputs (and/or actuator control commands associated with the $1^{st}$ set of outputs) are subsequently transmitted to a drive-by-wire control system of the vehicle (e.g., occurring in a primary operation mode), and wherein in an event that a trigger condition occurs (e.g., the low-level platform loses communication with the computing system; the low-level safety platform detects inconsistencies and/or errors in the trajectory and/or control commands transmitted by the computing system; etc.) transmits a retrieved trajectory (or any other instructions) from a $2^{nd}$ set of outputs 106 to the vehicle communication network (e.g., occurring in a secondary operation mode, equivalently referred to herein as a fallback operation mode).

In specific examples, the low-level safety platform includes one or more embedded controllers.

Additionally or alternatively, the system 100 can include any other suitable components.

4. Method

As shown in FIG. 2, a method S200 for autonomous vehicle operation includes determining a set of inputs S210; storing any or all of the set of inputs S220; and facilitating operation of an autonomous agent based on the set of inputs S230. The method functions to facilitate control of an autonomous agent and/or fallback operation of the autonomous agent mode. More preferably, the system 100 can function to enable operation of a vehicle in an event that a computing system of the vehicle (e.g., autonomous computing system) fails and/or loses communication abilities. However, the method can otherwise suitably function.

In variants, the method S200 can additionally or alternatively include any or all of: retrieving a stored input; selecting and/or validating an input; in an event that communication with the computing system is present, transmitting a $1^{st}$ output (e.g., $1^{st}$ trajectory) to the communication network; in an event that communication with the computing system is lost, transmitting a $2^{nd}$ output (e.g., set of actuator control commands, $2^{nd}$ trajectory, set of waypoints, any other instructions, etc.) to the communication network; and/or any other suitable process(es) performed in any suitable order. Further additionally or alternatively, the method 200 can include any or all of the processes described in any or all of: U.S. application Ser. No. 16/514,624, filed 17-Jul. 2019, now issued as U.S. Pat. No. 10,564,641; U.S. application Ser. No. 16/505,372, filed 8 Jul. 2019, now issued as U.S. Pat. No. 10,614,709; U.S. application Ser. No. 16/540,836, filed 14 Aug. 2019; and U.S. application Ser.

No. 16/792,780, filed 17 Feb. 2020; each of which is incorporated herein in its entirety by this reference, or any other suitable processes performed in any suitable order. The method S200 can be performed with a system 100 as described above and/or any other suitable system.

The method S200 is preferably performed continuously and/or repeatedly throughout operation of the autonomous agent, such as at every election step (e.g., every decision-making step, at a predetermined frequency between once per second and 100 times per second, between 20 and 30 times per second, less than once per second, greater than 100 times per second, etc.) and/or every control step (e.g., each actuator control output generation step) of the autonomous agent. Additionally or alternatively, the method S200 and/or any sub-elements therein can be performed at a predetermined frequency; in response to a trigger (e.g., detection of a change in autonomous agent environment, detection of a change in operating conditions of an autonomous agent, based on teleoperator input, etc.); at random intervals of time; and/or at any other suitable times.

4.1 Method—Determining a Set of Inputs S210

The method 200 includes determining a set of inputs S210, which functions to determine inputs for vehicle control; and/or functions to determine information with which to generate and/or select instructions (e.g., a trajectory, path, set of waypoints, control commands, etc.) for the agent.

S210 is preferably performed continuously throughout the method 200 (e.g., continuously throughout the agent's traversal of a route), but can additionally or alternatively be performed at any suitable time(s) (e.g., as described above). Each of set of inputs are preferably received at the low-level safety platform and generated at the computing system, but can additionally or alternatively be received at any suitable component(s) (e.g., the computing system) and/or generated by any suitable component(s) (e.g., the low-level safety platform).

In variants, determining a set of inputs S210 can include: determining a primary plan; determining a fallback plan; and determining a set of sensor inputs.

S210 can include determining a primary plan, which can include optionally generating a primary plan with the computing system and/or receiving the primary plan at the low-level safety platform (e.g., as the $1^{st}$ set of outputs 104 of the computing system).

The primary plan can include and/or be equivalently referred to herein as the $1^{st}$ set of outputs 104, wherein the primary plan can include and/or represent any or all of: the trajectory (or any other instructions) determined for the agent to traverse a selected route for the agent (e.g., operational trajectory; operational waypoints), vehicle control commands (e.g., associated with a trajectory of the $1^{st}$ set of trajectories), and/or any other suitable instructions or outputs. The selected primary plan is preferably along a predetermined route (e.g., a fixed route), such as in use cases wherein the ego vehicle is configured to drive along one or more fixed routes (e.g., to drive passengers along a shuttle route), but can additionally or alternatively be a dynamically determined route and/or any combination.

The primary plan is preferably received at the vehicle control system to operate the vehicle as a series of outputs (e.g., control commands determined in accordance with the trajectory) from the computing system and/or vehicle communication network (e.g., as they are generated, at a predetermined frequency, at each election cycle, etc.), wherein each of the outputs represents and/or is associated with the optimal and/or routine trajectory for the agent (e.g., based on the route of the agent; as determined by the autonomous computing system). Additionally or alternatively, the primary plan can optionally be received at the low-level safety platform (e.g., prior to being sent to the vehicle control system).

The primary plan is preferably determined continuously (e.g., at a predetermined frequency, at each election cycle, as it is generated, etc.) in a nominal operating mode (e.g., at the computing system, at the low-level safety platform; while the low-level safety platform is in communication with the computing system; while the computing system is operational), but can additionally or alternatively be determined and/or received at any suitable time(s) and/or in response to any suitable triggers.

The primary plan is preferably determined as a $1^{st}$ set of outputs (and/or actuator control commands associated with the $1^{st}$ set of outputs) of the computing system based on inputs from the system and any or all of: sensor input from the set of sensors (e.g., sensor suite), a selected route for the agent, a map (e.g., indicate the selected route, indicating other available routes, indicating all possible routes, etc.), a behavioral policy (e.g., as determined in accordance with a multi-policy decision making module), and/or any other suitable inputs. Additionally or alternatively, the primary plan can be determined based on the ego-vehicle state estimate and a (current) environmental representation (e.g., which identifies a set of agents and/or objects in the environment of the autonomous agent) of the computing system and/or an autonomous computing submodule therein. Additionally or alternatively, the $1^{st}$ set of outputs can be otherwise determined based on any suitable inputs. As an example, the primary plan can be determined in accordance with the systems and/or methods as described in U.S. application Ser. No. 16/514,624, filed 17 Jul. 2019, and U.S. application Ser. No. 16/792,780, filed 17 Feb. 2020, each of which is incorporated herein in its entirety by this reference.

In a preferred example, the primary plan is not sent to the low-level safety platform.

In an alternative example, S210 can include receiving the primary plan at the low-level safety platform.

However, a primary plan can be otherwise suitably determined as a part of S210.

S210 can include determining a fallback plan (equivalently referred to herein as a secondary plan), which can be utilized in the event that a primary plan is unavailable and/or in response to detection of a fallback event. The fallback plan is preferably generated at a high-level safety platform of the computing system (e.g., at a fallback planner of the computing system) and provided (e.g., as a $2^{nd}$ set of outputs of the computing system wherein the $1^{st}$ set of outputs are not provided, as a $2^{nd}$ set of outputs of the computing systems wherein the $1^{st}$ set of outputs are also provided, etc.) to the low-level safety platform. The fallback plan is preferably determined contemporaneously with (e.g., in parallel, in series, in an overlapping time period with, within a predetermined time threshold of generation, based on the same set of inputs received at the computing system, etc.) the primary plan, such that either of a primary plan (and/or a corresponding operational trajectory) and a fallback plan (and/or corresponding fallback trajectory) could be implemented for the agent at an associated time and/or range of times. Additionally or alternatively, the fallback plan can be determined periodically (e.g., at the same frequency as the primary plan, at a different frequency relative to the primary plan), synchronously with the primary plan, asynchronously with the primary plan, and/or with any other suitable timing. The fallback plan can optionally be received at the low-level safety platform contemporaneously with (e.g., in parallel with; in quick succession with; within a predetermined time threshold of less than 30 seconds, 20 seconds, 10 seconds, 5 seconds, 1 second, 0.5 seconds, 100 milliseconds, 50 milliseconds, 10 milliseconds, 1 millisecond, etc.) with an associated trajectory of the $1^{st}$ set of outputs (e.g., in the same data packet), but can additionally or alternatively be received at the low-level safety platform at any suitable times. Alternatively, the fallback plan can be received absent of the primary plan at the low-level safety platform.

In variants, determining the fallback plan can include: determining a set of navigational edges; classifying a navigational edge; and based on the classification of the navigational edge, generating the fallback plan based on the ego-vehicle state and the navigational edge.

A navigational edge (equivalently referred to herein as a state and/or safe state) preferably refers to a location (e.g., as prescribed at a map) at which the ego vehicle can come to a stop (e.g., safely come to a stop at, come to a stop at for at least a predetermined amount of time, re-enter the road from after being stopped, safely release passengers at, etc.) and/or otherwise occupy. Navigational edges can be predetermined (e.g., at known static positions on a map), dynamically determined (e.g., at fixed distances from the vehicle, based on a current environmental representation of a computing system; dynamically generated using a neural network, etc.), received from a remote endpoint (e.g., received from a teleoperator platform, etc.), determined according to a set of predetermined rules/heuristics, and/or otherwise suitably determined. Navigational edges are preferably navigational targets (e.g., point, region, line segment, etc.) along infrastructure boundaries of the environment (e.g., sides of a current lane of the vehicle, along a shoulder of a highway, apex of an intersection corner, a driveway or side street intersecting a current road, parking lots, parking spots, etc.), but can be any other suitable edges or targets. In a specific example, navigational edges can be evaluated at the edges of a current lane and/or roadway at a set of predetermined distances from the vehicle, which can reduce the required computation by minimizing a search space.

Figure 9A:
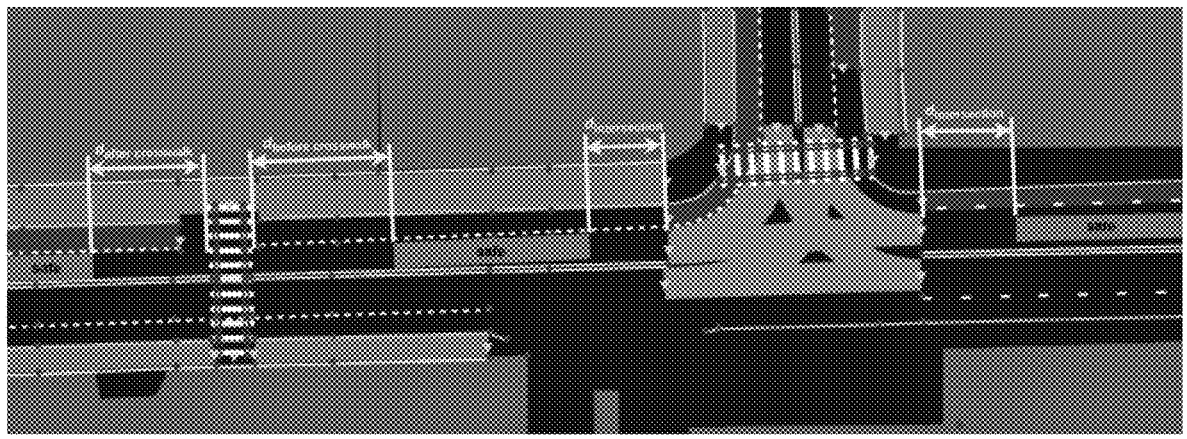
FIGS. 9A and 9B are a first and second diagrammatic example of safe state identification criteria for navigational edges, respectively.
Figure 9B:
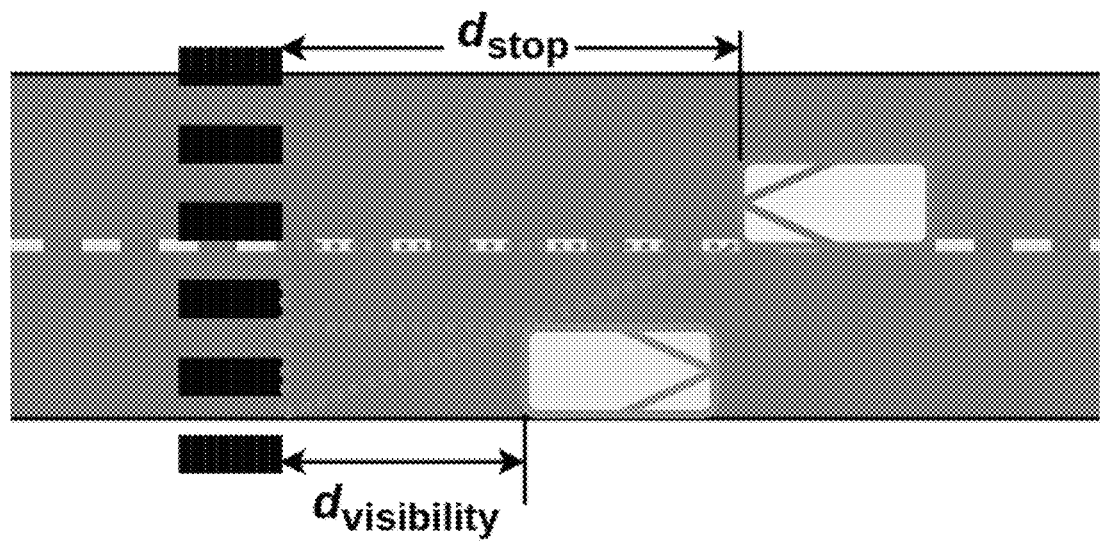

Navigational edges can be scored and/or classified (e.g., tagged as available) based on a current environmental representation and/or the current vehicle state. As an example, navigational edges can be considered "available" if the vehicle can slow, halt, and/or enter a holding pattern at the navigational edge without excessively impeding traffic (e.g., fully blocking a lane, such that cars can pass on one and/or both sides, braking in excess of a predetermined threshold, etc.). As an example, a navigational edge may be rejected and/or classified as "unavailable" if it is within an intersection (and/or within a predetermined minimum distance relative to an intersection, within "$d_{intersection}$" as shown in FIG. 9A, etc.); if another agent will occupy it (e.g., has intent on a corresponding region of roadway); if it is within and/or is within a minimum distance of (e.g., within an average vehicle's stopping distance of, within a monitored vehicle's stopping distance, within a length of vehicle, within between 10 and 30 feet, within 50 feet, within a stopping distance calculated based on the road's speed limit and a most extreme braking acceleration, within "$d_{aftercrosswalk}$" or "$d_{beforecrosswalk}$" as shown in FIG. 9A, etc.) a crosswalk (e.g., such that another vehicle approaching the crosswalk would have limited visibility of the crosswalk, an example is shown in FIG. 9B); if it is within and/or within a threshold distance (e.g., within between 10 and 30 feet, within 50 feet, etc.) of a railroad crossing or other landmark (e.g., bus stop); if the ego vehicle or another vehicle would have to exceed a braking threshold and/or stopping distance in order to safely maneuver the environment; if another vehicle (e.g., another autonomous vehicle) is occupying or planning to occupy the edge and/or region; and/or if it does not satisfy a minimum passing clearance.

Navigational edges can be further classified and/or selected based on a classification model (e.g., heuristic classifier, decision tree, etc.) and/or using a set of multi-policy evaluations, statics constraints, dynamic constraints, collision constraints (e.g., one or more agents in the environmental representation have intent on the navigational edge and/or are associated with a state estimate that will likely result in a collision; one or more objects intersects the), kinematic constraints of the vehicle (e.g., actuator limitations), a minimum distance constraint (e.g., proximity to the vehicle; as a function of current vehicle velocity, etc.), and/or any other suitable evaluations/metrics.

In variants, an example of which is shown in FIG. 6, a fallback planner of the high-level safety platform can classify states as available based on an initial available state classification (e.g., which assumes other agents in the environment are static within a planning horizon (e.g., between generating the fallback plan and executing a corresponding maneuver, etc.), generates a fallback plan (e.g., as a polynomial path, set of waypoints, etc.) for each navigational edge (e.g., a polynomial path between the current vehicle pose which terminates at the navigational edge), and then selects a fallback plan based on a dynamic comparison of the resulting maneuvers/trajectories. As an example, the fallback planner can select the fallback plan which does not exceed a maximum braking constraint and/or a maximum steering constraint.

The fallback plan (e.g., generated by the computing system) can include high-level guidance, such as waypoints, kinematic trajectories, location targets, paths (e.g., smooth, polynomial paths, etc.); low-level control commands (e.g., trajectories, actuator control instructions, etc.); and/or any other suitable information. In a preferred set of variations, the fallback plan includes a set of waypoints which are determined (e.g., at the fallback plan evaluation block of FIG. 6) based on a polynomial fallback trajectory designed to connect the vehicle's current position to an identified navigational edge. In a set of specific examples of this preferred set of variations, the primary plan is of a different data type than the fallback plan (e.g., such as a trajectory and/or path rather than a set of waypoints). Additionally or alternatively, the primary plan and fallback plan can be of the same data type(s).

In a specific example, a fallback plan (fallback maneuver) can be generated as a sequence of polynomials (e.g., $7^{th}$ order polynomials, less than $7^{th}$ order polynomials, greater than $7^{th}$ order polynomials, between $1^{st}$ and $10^{th}$ order polynomials, between $5^{th}$ and $10^{th}$ order polynomials, etc.) to pull over to the nearside edge of an available state, wherein the nearside is the side (left or right) that has the same traffic direction as the ego vehicle.

In variants, the fallback plan can optionally include or be associated with an expiration parameter and/or condition which prescribes a limited use for implementing the fallback plan (e.g., safety trajectory, control commands associated with a safety trajectory, etc.). This preferably functions to prevent the use of an output which does not accurately represent the current environment of the user (e.g., in an event that the computing system failed too long ago). Additionally or alternatively, the expiration parameter can perform any other suitable functions. The expiration parameter preferably includes and/or prescribes a threshold time and/or distance in which the output of the $2^{nd}$ set of outputs (equivalently referred to herein as a $2^{nd}$ output) can be used (e.g., from the time of generation, from the time of receipt, etc.), but can additionally or alternatively prescribe multiple parameters and/or any other suitable parameters. Alternatively, the fallback plan can otherwise exclude an expiration parameter (e.g., such as in cases where the fallback plan is replaced with and/or updated via a subsequent determination of a fallback plan at a later timestep; etc.).

However, the fallback plan can be otherwise suitably determined.

S210 can optionally include determining a set of sensor inputs which can be used to validate an operational plan (e.g., primary plan and/or fallback plan) and/or facilitate guidance of the autonomous agent according to a fallback plan. Sensor inputs are preferably generated by the sensor suite and received at the low-level safety platform (e.g., directly; by way of the vehicle communication network; without passing through the computing system; etc.).

The set of sensor inputs can be used for any or all of: implementing and/or validating a trajectory (e.g., check that the safety trajectory does not collide with any objects), selecting a trajectory, determining a new trajectory (e.g., when the available trajectories is an empty set), and/or can function to perform any other suitable processes. The set of sensor inputs received at the low-level safety platform are preferably received from a subset of the total set of sensors (e.g., only encoders and IMUs, only a particular view of sensors such as a particular subset of LIDAR sensors, etc.), but can additionally or alternatively be received from the entire sensor system (e.g., all sensors, all types of sensors, upon redirection of the set of sensor inputs from the computing system to the low-level safety platform, etc.), and/or any other sensors. In a specific example, the set of sensor inputs received by the low-level safety platform can include: odometry sensor inputs (e.g., GPS velocity and/or inertial sensor measurements), time-of-flight sensor inputs (e.g., Lidar, radar, "bumper" sensors, etc.), and/or any other suitable inputs. Further additionally or alternatively, the low-level safety platform can operate in absence of sensor information (e.g., where feedback control is delegated to downstream control endpoints and/or compute nodes, etc.). The set of sensor inputs can be received independently of the fallback plan (e.g., continuously), with the fallback plan, in response to a trigger (e.g., entering a fallback operation mode), continuously, and/or at any other suitable times (e.g., as described above).

In preferred variations, the low-level safety platform receives inputs from sensors configured to determine a position (e.g., location, pose, etc.) of the agent, such as inputs from one or more encoders and/or inertial measurement units (IMUs).

In a first variation, S210 includes receiving, at the low-level safety platform: a fallback plan (e.g., waypoints and/or corresponding fallback trajectory), and optionally one or more sensor inputs.

In a second variation, S210 includes receiving, at the low-level safety platform: a primary plan (e.g., operation trajectory) along with a fallback plan (e.g., waypoints and/or corresponding fallback trajectory), and optionally one or more sensor inputs.

In variants, the inputs can additionally include an ego-vehicle pose estimate (e.g., localized ego-vehicle reference frame) and/or an environmental representation (e.g., a set of agents/objects; in ego-vehicle reference frame) as determined by the computing system.

However, inputs can be otherwise suitably determined and/or received.

4.2 Method—Storing any or all of the Set of Inputs S220

The method S200 can include storing any or all of the set of inputs S220, which functions to maintain a persistently available fallback plan (and/or a fallback trajectory associated therewith) which can be implemented in an event that the computing system fails.

S220 preferably includes storing the fallback plan, but can additionally or alternatively include storing any or all of the other inputs. The fallback plan is preferably stored within a memory of the low-level safety system and/or a local memory of the system (e.g., which is accessible without reliance upon the primary computing system), however the fallback plan can additionally or alternatively be stored and/or validated remotely, and/or can be otherwise suitably stored.

In a first set of variants, the expiration parameter is further preferably stored with its associated fallback plan (e.g., actuator control commands, safety trajectory, etc.) but can additionally or alternatively not be stored, separately stored, and/or otherwise stored.

In a second set of variants, the fallback plan can be updated and/or replaced upon receipt and/or validation of a subsequent fallback plan (e.g., from the computing system and/or communication interface).

The fallback plan (and/or any other inputs) is preferably temporarily stored (e.g., cached, in short-term storage), but can additionally or alternatively be permanently stored, transmitted to a storage site (e.g., remote server), and/or otherwise stored and/or used. S220 can optionally include deleting and/or replacing previous plans/trajectories of the $2^{nd}$ set of outputs, such as based on any or all of: a predetermined number of outputs (e.g., 2, 3, 4, 5, more than 5, etc.); a predetermined storage amount; a replacement of each previous $2^{nd}$ output with a new $2^{nd}$ output; expiry of the expiration parameter; and/or based on any other suitable information. In some variations, S220 includes checking (e.g., routinely checking, checking with each receipt of the safety trajectory, etc.) any or all of the stored expiration parameters for satisfaction of a set of one or more threshold conditions (e.g., upper time threshold, upper distance threshold, odometry uncertainty threshold, etc.), wherein the associated $2^{nd}$ outputs can be deleted and/or removed from consideration in subsequent processes of the method in an event that the threshold conditions are satisfied.

In a first variation, S220 includes storing each of the $2^{nd}$ set of outputs in storage associated with the low-level safety platform (e.g., storage of an embedded controller), wherein previous versions of the $2^{nd}$ set of outputs can optionally be removed from storage in response to one or more triggers.

However, inputs can be otherwise suitably stored.

4.3 Method—Facilitating Operation an Autonomous Agent Based on the Set of Inputs S230

The method S200 can include facilitating operation of an autonomous agent based on the set of inputs S230, which functions to enable operation of the autonomous agent which can be resilient in all or nearly all types of agent failure, such as failure of and/or lost communication with a computing system of the autonomous agent. Additionally or alternatively, S230 can function to enable the autonomous agent to follow a route, enable the autonomous agent to implement a non-generic fallback plan and/or set of control commands which is configured for the current (and/or a very recent) environment and/or behavior/action of the agent (e.g., approaching a left turn at an intersection, driving in a right lane of a freeway, approaching a stop sign, etc.), and/or can perform any other suitable functions. S230 is preferably performed via a drive-by-wire control system of the agent, but can additionally or alternatively be performed with any suitable control system(s).

S230 can include selectively operating the system (and/or a low-level safety platform thereof) between a primary mode (e.g., in which the primary plan is implemented) and a fallback mode (e.g., in which a fallback plan is implemented) (transmitting a set of outputs to a communication network based on the operating mode); wherein in the primary mode S230 can facilitate operation of the vehicle based on the primary plan (e.g., determined in S210); wherein in the fallback mode S230 facilitate operation the vehicle based on the stored fallback plan.

S230 can include transitioning between a primary mode and a fallback mode based on a determination of one or more fallback conditions, such as by a watchdog (a.k.a. validation module) of the low-level safety platform. A fallback condition be determined in response to detecting an absence of inputs from the computing system (e.g., after an expected time of arrival has passed, after a predetermined time period has passed, etc.), which can indicate that the computing system has failed. Additionally or alternatively, a fallback condition can be determined based on an active determination that the computing system has failed (e.g., from a sensor system and/or set of health monitors, in response to an alert and/or message, etc.; via a watchdog monitoring the health of the outputs 104 and/or 106) and/or its outputs cannot be trusted, in response to determining that another system component (e.g., sensor system) has failed, in response to detecting one or more data inconsistencies (e.g., in an upstream data source), in response to a particular situation and/or environment (e.g., emergency vehicle such as ambulance and/or fire engine detected nearby, unusual situations such as failures and/or edge cases, etc.), and/or at any other suitable times and/or in any other motivating conditions for the agent to reach a minimum risk condition.

In variants, instructions (e.g., a trajectory, a set of waypoints, etc.) corresponding to the primary plan or fallback plan (e.g., generated by the computing system, the low-level safety platform, etc.) can be transmitted to a control system (e.g., drive-by-wire system) of the agent and/or to any other suitable components of the system. The instructions are preferably either a plan associated with the $1^{st}$ set of outputs 104 (e.g., primary plan, trajectory, etc.) or the $2^{nd}$ set of outputs 106 (e.g., fallback plan, set of waypoints, etc.), but can additionally or alternatively include a different plan (e.g., a modified trajectory determined based on a trajectory of the $2^{nd}$ set of outputs), other control commands, other information, and/or any other suitable instructions to navigate the ego vehicle.

Figure 8:
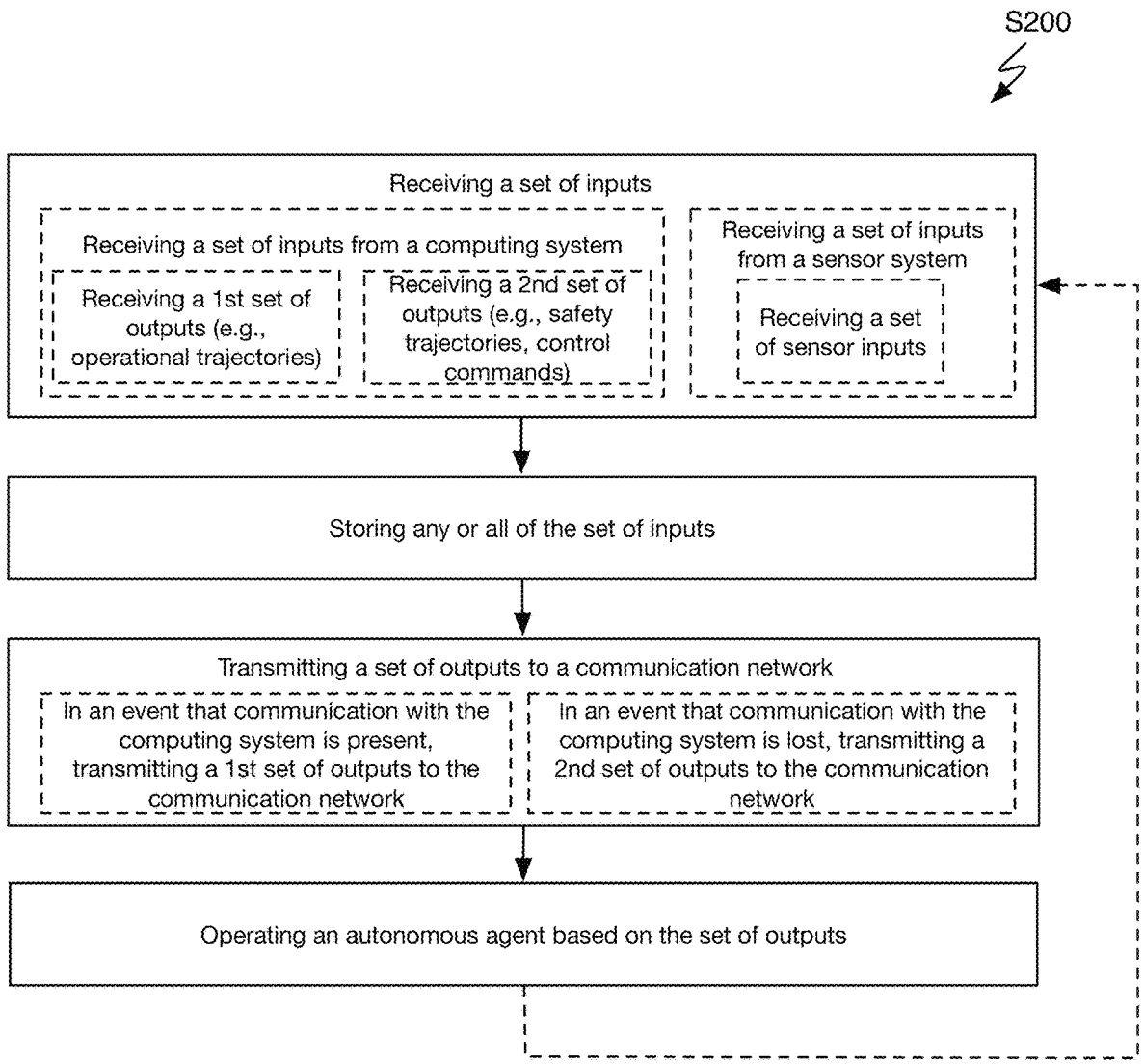
FIG. 8 is a schematic of an example of a method for implementing a low-level safety operation of a vehicle.

In one set of variants, an example of which is shown in FIG. 8, S230 can include: detecting that communication with the computing system is present (e.g., with a watchdog), and, in response, controlling the system in a primary operation mode by transmitting instructions (e.g., a most recent trajectory) of the $1^{st}$ set of outputs to the communication network, which functions to provide the control system (via the communication network) with normal operational trajectories along a route of the agent when the computing system is operational. S230 can additionally include, detecting that communication with the computing system is lost, and, in response controlling the system in a fallback operation mode by transmitting instructions (e.g., set of waypoints, etc.) associated with the $2^{nd}$ set of outputs (e.g., fallback plan) to the communication network, which functions to provide the control system with a trajectory and/or positions (e.g., waypoints) and/or control commands configured to operate the vehicle safely (e.g., to pull over, to continue driving if the vehicle cannot pull over, to finish an action and then pull over and/or stop, to safely operate until the computing system is operational, to reach a safe state/ navigational edge, etc.) in an event of an emergency (e.g., computing system failure). Additionally or alternatively, S230 can function to ensure that a selected output of the $2^{nd}$ set of outputs is safe to implement (e.g., based on its associated expiration parameter, based on an obstacle detection routine, etc.), and/or can perform any other suitable functions.

In some variants, facilitating operation in the fallback mode can optionally include: checking the expiration parameter of the most recent $2^{nd}$ output (e.g., set of waypoints, set of control commands, safety trajectory, etc.), wherein if the most recent $2^{nd}$ output is not expired, the corresponding trajectory is passed to the communication network.

Additionally or alternatively, S230 can optionally include validating the $2^{nd}$ output (e.g., based on sensor inputs to ensure that the agent does not encounter an obstacle), modifying the $2^{nd}$ output (e.g., based on the sensor inputs), generating a new set of waypoints and/or trajectory and/or set of control commands (e.g., based on the sensor inputs, in an event that all safety trajectories are expired, etc.), and/or any other processes.

Additionally or alternatively, facilitating operation in the fallback mode can include selecting from multiple viable $2^{nd}$ output options (e.g., multiple safety trajectories in an event that multiple trajectories are not expired) and/or any other suitable processes.

Further additionally or alternatively, facilitating operation in the fallback mode can include: triggering any other processes, such as triggering the receipt of a set of sensor inputs (e.g., as described above). In some variations, for instance, in response to detecting that the computing system has failed, the low-level safety platform can trigger sensor inputs normally received at the computing system and/or a subset of these sensor inputs (e.g., a partial subset of LIDAR sensors, sensors from only a relevant view of the agent, etc.) to be additionally received and/or diverted to the low-level safety platform. Additionally or alternatively, S230 can be performed in absence of sensor inputs, have already received sensor inputs (e.g., continuously receiving sensor inputs), and/or S230 can include any other suitable processes.

S230 can additionally or alternatively include any other suitable processes and/or be otherwise suitably performed.

However, the method can include any other suitable elements and/or can otherwise facilitate fallback planning and control.

4.5 Method—Variations

Figure 3A:
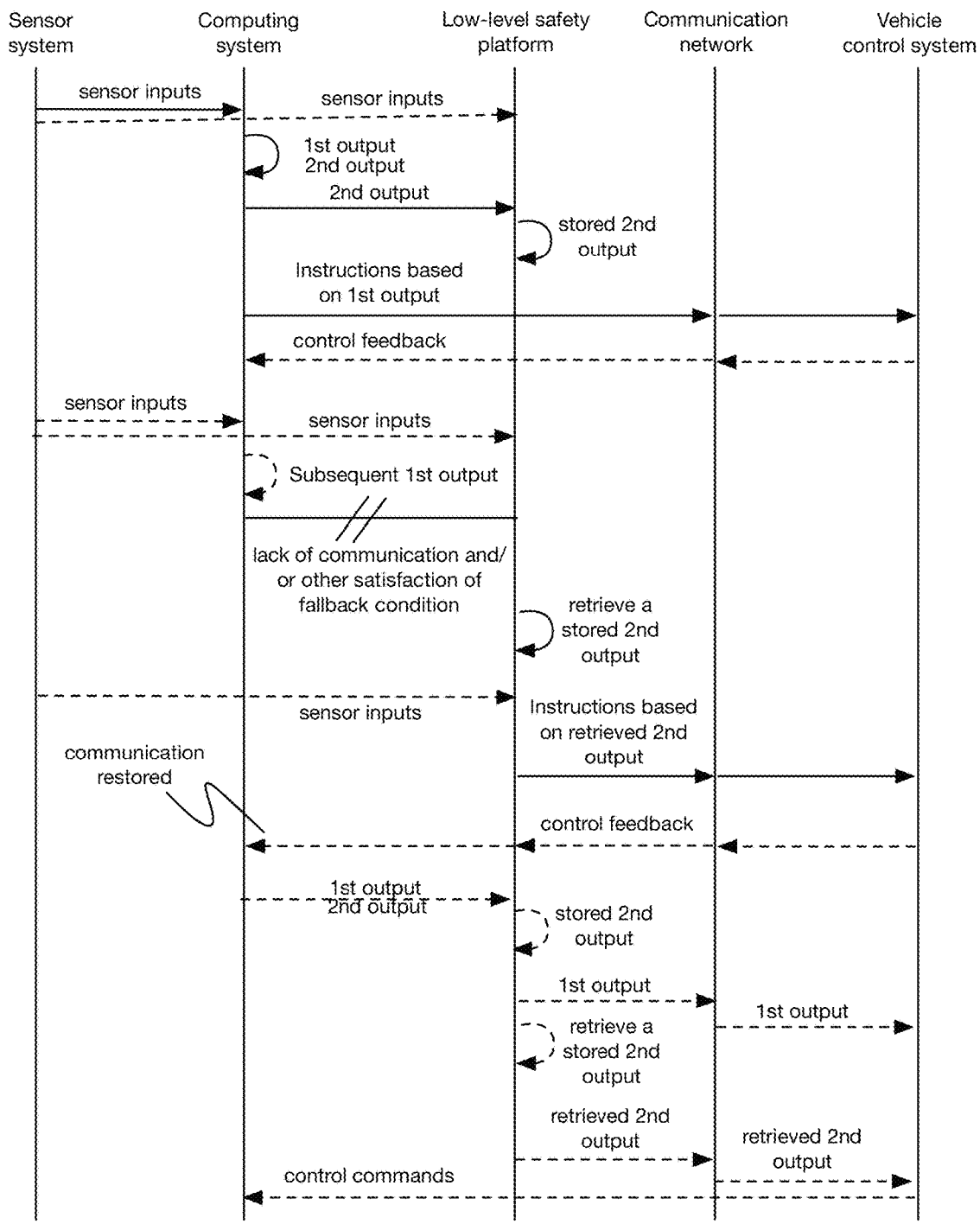
FIGS. 3A and 3B are a first and a second schematic variation of a set of inputs and outputs exchanged among the system in a variation of the method for implementing a low-level safety operation of a vehicle, respectively.
Figure 3B:
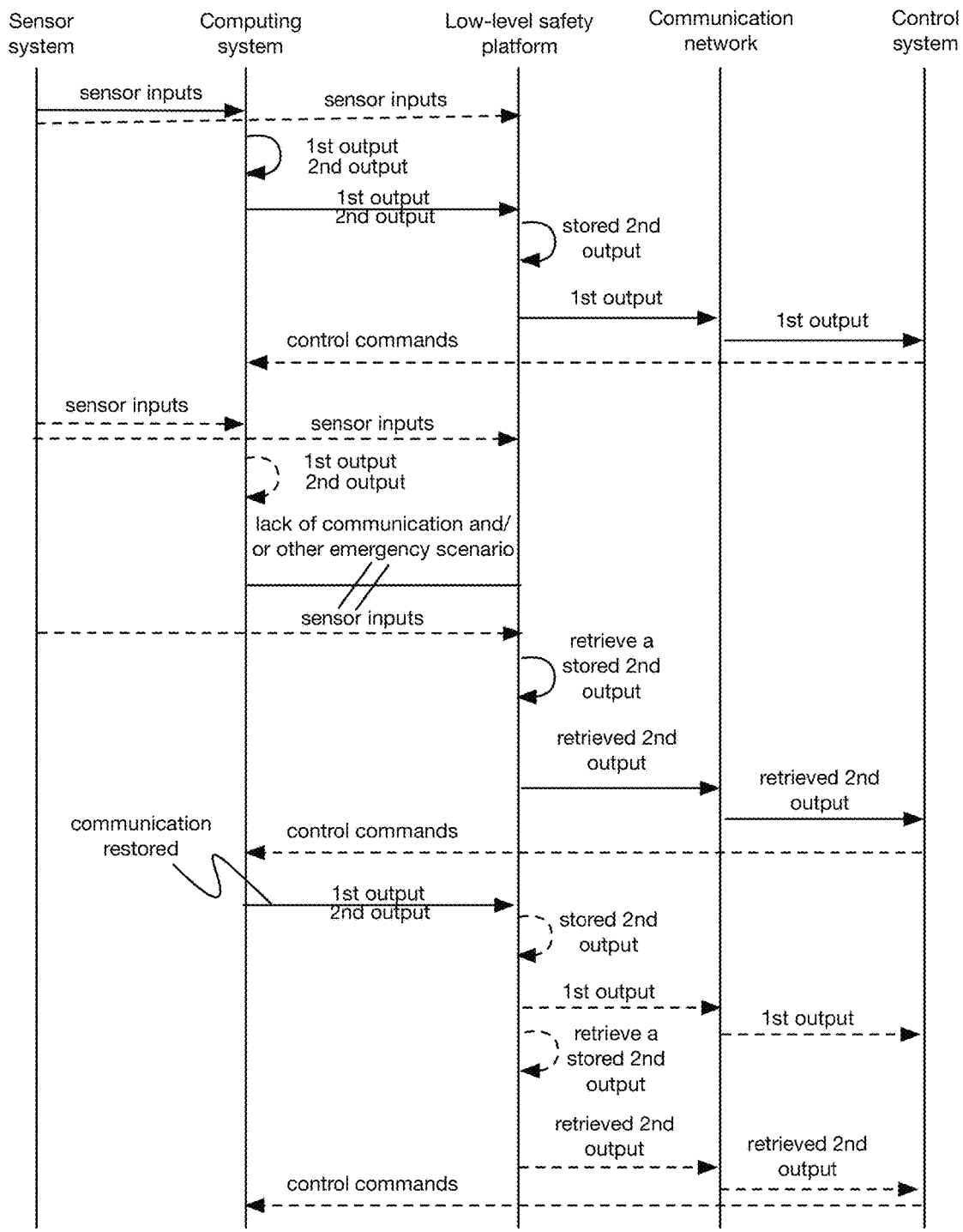

In a first variation of the method 200 (e.g., as shown in FIG. 2, as shown in FIGS. 3A-3B, etc.), the method includes: receiving, at a low-level safety platform, a set of inputs from a computing system, wherein the set of inputs includes a $2^{nd}$ output (e.g., a safety trajectory, a set of waypoints configured to reach a nearest navigational edge, a set of raw actuator control commands determined based on the set of waypoints, etc.), and optionally an expiration parameter associated with the $2^{nd}$ output; storing the $2^{nd}$ output and its expiration parameter; in an event that communication with the computing system is lost and/or another trigger is initiated, transmitting a $2^{nd}$ output to the communication network; and operating the autonomous agent based on the output transmitted to a control system (e.g., drive-by-wire control system) via the communication network.

In a second variation of the method 200 (e.g., as shown in FIG. 2, as shown in FIGS. 3A-3B, etc.), the method includes: receiving, at a low-level safety platform, a set of inputs from a computing system, wherein the set of inputs includes a $1^{st}$ output (e.g., an operational trajectory), a $2^{nd}$ output (e.g., a safety trajectory, a set of raw actuator control commands, etc.), and an expiration parameter associated with the $2^{nd}$ output; storing the $2^{nd}$ output and its expiration parameter; in an event that communication with the computing system is present, transmitting a $1^{st}$ output to the communication platform; in an event that communication with the computing system is lost and/or another trigger is initiated, transmitting a $2^{nd}$ output to the communication network; and operating the autonomous agent based on the output transmitted to a control system (e.g., drive-by-wire control system) via the communication network.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUS, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:
1. A system comprising:
a vehicle comprising a set of sensors;
an autonomous computing system communicatively coupled to the set of sensors, the autonomous computing system configured to determine an operational plan and a set of fallback plans based on measurements from the set of sensors; and
a lower-level control platform comprising an embedded fallback controller and a memory, the lower-level control platform communicatively coupled to the autonomous computing system and configured to:
in a nominal operational mode, control the vehicle based on the operational plan and store the set of fallback plans at the memory;
determine satisfaction of a trigger condition, and, in response, transition from the nominal operational mode to a fallback operational mode; and
in the fallback operational mode, autonomously control the vehicle with the embedded fallback controller to deviate from the operational plan based on the set of fallback plans stored at the memory.

2. The system of claim 1, wherein the autonomous computing system is further configured to update the fallback plan based on a satisfaction of an expiration condition of the fallback plan while the vehicle is controlled based on the operational plan.

3. The system of claim 1, wherein, while controlling the vehicle based on the set of fallback plans, the embedded fallback controller is configured to:
estimate an ego-vehicle pose using odometry;
based on the ego-vehicle pose, detect an obstacle along a path of the vehicle corresponding to a fallback plan of the set of fallback plans; and
execute a full stop based on the obstacle detection.

4. The system of claim 1, wherein the embedded fallback controller is configured to facilitate autonomous control of the vehicle based on the operational plan by selectively relaying the operational plan to a vehicle control system via a vehicle communication network.

5. The system of claim 1, wherein autonomously controlling the vehicle with the embedded fallback controller based on the set of fallback plans comprises retrieving a most recently generated fallback plan from the set of fallback plans.

6. The system of claim 1, wherein determining a fallback plan of the set of fallback plans comprises:
referencing a map to determine a set of predetermined locations within the map;
selecting a location from the set of predetermined locations; and
generating a path from the autonomous vehicle to the selected location.

7. The system of claim 1, wherein the trigger condition comprises a communication lapse between the autonomous computing system and a validation endpoint.

8. The system of claim 7, wherein the validation endpoint comprises a vehicle communication network node.

9. The system of claim 1, wherein the trigger condition comprises a loss of communication between the autonomous computing system and the lower-level control platform.

10. The system of claim 1, wherein the trigger condition comprises an error in a command generated by the computing system.

11. A system for fallback control of a vehicle, the system comprising:
a memory; and
a fallback controller communicatively coupled to a vehicle computing system and configured to operate between a primary mode and a fallback mode;
wherein, in the primary operational mode, the fallback controller is configured to:
receive a set of fallback plans from the vehicle computing system;
store the set of fallback plans at the memory;
wherein, in the fallback operational mode, the fallback controller is configured to:
retrieve a fallback plan from the memory; and
autonomously control the vehicle to deviate from the operational plan based the fallback plan;
wherein the system is configured to automatically transition from the primary mode to the fallback mode in response to satisfaction of a fallback trigger event, wherein the fallback trigger event is determined by the fallback controller, wherein the fallback controller operates at a lower level processing capacity than the vehicle computing system.

12. The system of claim 11, wherein, in the primary operational mode, the fallback controller is configured to facilitate autonomous operation of the vehicle based on an operational plan from the vehicle computing system.

13. The system of claim 11, wherein the fallback controller is an embedded controller which is communicatively connected to the autonomous computing system and a vehicle communication network.

14. The system of claim 11, further comprising a watchdog system which is communicatively coupled to the vehicle computing system, wherein the watchdog system is configured to determine satisfaction of the fallback trigger event based on communications received from the vehicle computing system.

15. The system of claim 11, wherein the fallback trigger event comprises a communication lapse between the vehicle computing system and a validation endpoint.

16. The system of claim 15, wherein the validation endpoint comprises a vehicle communication network node.

17. The system of claim 11, wherein the fallback trigger event comprises a loss of communication between the computing system and the fallback controller.

18. The system of claim 11, wherein the fallback trigger event comprises an error in a command generated by the computing system.

19. The system of claim 11, wherein the fallback controller is further configured to update the set of fallback plans stored at the memory based on an expiration parameter.

20. The system of claim 11, wherein the fallback controller is further configured to execute a full stop based on an obstacle detection along a path of the fallback plan.

* * * * *